US012000209B2

(12) United States Patent
Tan et al.

(10) Patent No.: US 12,000,209 B2
(45) Date of Patent: Jun. 4, 2024

(54) ROLLING CURTAIN MOUNTING HOUSING AND ELECTRIC ROLLING CURTAIN

(71) Applicant: Guangdong RAEX Intelligent Technology Co., Ltd, Guangzhou (CN)

(72) Inventors: Jinbin Tan, Guangzhou (CN); Yusheng Li, Guangzhou (CN)

(73) Assignee: Guangdong RAEX Intelligent Technology Co., Ltd, Guangzhou (CN)

( * ) Notice: Subject to any disclaimer, the term of this patent is extended or adjusted under 35 U.S.C. 154(b) by 384 days.

(21) Appl. No.: 17/546,539

(22) Filed: Dec. 9, 2021

(65) Prior Publication Data

US 2023/0024688 A1 Jan. 26, 2023

(30) Foreign Application Priority Data

Jul. 21, 2021 (CN) ......................... 202121663227.6
Sep. 23, 2021 (CN) ......................... 202122307459.4
Sep. 30, 2021 (CN) ......................... 202122419845.2

(51) Int. Cl.
*E06B 9/42* (2006.01)
*E06B 9/72* (2006.01)
*E06B 9/68* (2006.01)

(52) U.S. Cl.
CPC .................. *E06B 9/42* (2013.01); *E06B 9/72* (2013.01); *E06B 2009/6809* (2013.01)

(58) Field of Classification Search
CPC ....... E06B 9/72; E06B 9/42; E06B 2009/6809
USPC .......................................................... 160/310
See application file for complete search history.

(56) References Cited

U.S. PATENT DOCUMENTS

2014/0231032 A1* 8/2014 Blair ......................... E06B 9/68 160/310
2016/0017957 A1* 1/2016 Graybar ................ F16H 57/082 475/149
2019/0301241 A1* 10/2019 Campagna ................ E06B 9/72
2021/0363822 A1* 11/2021 Blair ......................... E06B 9/62

FOREIGN PATENT DOCUMENTS

CN 203978251 U 12/2014

* cited by examiner

*Primary Examiner* — Beth A Stephan

(57) ABSTRACT

A rolling curtain mounting housing and an electric rolling curtain are provided. The rolling curtain mounting housing includes a housing body, the housing body is disposed with an accumulator compartment, the accumulator compartment is disposed with an accumulator placement opening. The rolling curtain mounting housing is further disposed with a cover plate, the cover plate is configured to close the accumulator placement opening. The housing body includes an accumulator installation part and a housing extension part connected with each other, the housing extension extends outwards relative to the accumulator installation part, the accumulator installation part is disposed with the accumulator compartment. The cover plate further covers a side surface of the housing extension part on a same side as the accumulator placement opening when the cover plate closes the accumulator placement opening. The provided electric rolling curtain is more convenient to replace the accumulator.

18 Claims, 13 Drawing Sheets

ROLLING CURTAIN MOUNTING HOUSING AND ELECTRIC ROLLING CURTAIN

FIELD OF THE DISCLOSURE

The disclosure relates to the field of rolling curtain technologies, and more particularly to a rolling curtain mounting housing and an electric rolling curtain.

BACKGROUND OF THE DISCLOSURE

With the progress of science and technology, the use of electric rolling curtain has become quite common now, which has brought convenience to users to a certain extent. Electric rolling curtain motors can be divided into four types according to power supply modes. A first type is an alternating current (AC) powered curtain motor, which has high power and high horsepower, but has high power consumption, large noise and vibrates greatly and does not save energy; and moreover it can only be used for straight tracks and is mainly used in engineering. A second type is a direct current (DC) powered curtain motor, which has small volume, low vibration, low noise, low power consumption, but excessively low horsepower, and thus it is mainly used in homes and hotels. A third type is a battery powered curtain motor, which is powered by an ordinary dry battery, energy-saving and environment-friendly. A fourth type is a solar powered curtain motor, which is powered by solar cells, and the power comes from solar energy.

As to an existing battery powered curtain, a battery therefore is generally installed in a motor, which makes it difficult to replace the battery. If the motor is damaged, the whole power supply system cannot be used. For example, a Chinese patent (Publication No. CN203978251U) discloses a structure in which a battery is installed in a motor. Referring to FIG. 1, as to the curtain where the battery is installed in the motor, a roller 30 of the curtain is arranged in a shaft sleeve 20, the motor is arranged in the roller 30, a power supply module 50 includes a battery pack, and the battery pack is integrated into the motor 40. However, because a movable curtain group of the curtain would be opened or closed almost every day, the power consumption of the battery is quite fast. The structure that the battery is installed in the motor is very inconvenient to replacement of the battery, and when the battery is replaced, the motor needs to be disassembled and replaced as a whole, which is extremely inconvenient to use.

SUMMARY OF THE DISCLOSURE

In view of the shortcomings of the prior art, the disclosure provides a rolling curtain mounting housing and an electric rolling curtain, which are convenient for accumulator replacement.

Specifically, in an aspect, the disclosure provides a rolling curtain mounting housing, which may include a housing body, the housing body is disposed with an accumulator compartment, the accumulator compartment is disposed with an accumulator placement opening, the rolling curtain mounting housing is disposed with a cover plate, and the cover plate is configured to close the accumulator placement opening.

In an embodiment, the housing body may include an accumulator installation part and a housing extension part connected with each other. The housing extension part extends outwards relative to the accumulator installation part, the accumulator installation part is disposed with the accumulator compartment, and the cover plate covers a side of the housing extension part on a same side as the accumulator placement opening when the cover plate closes the accumulator placement opening.

In an embodiment, an end of the cover plate is hinged to the housing body, and another end of the cover plate is configured to switchably close and open the accumulator placement opening. The cover plate is disposed with a first magnetic structure, the housing body is disposed with a second magnetic structure matched with the first magnetic structure, and the first magnetic structure and the second magnetic structure are capable of adsorbing with each other to thereby make the cover plate close the accumulator placement opening.

In an embodiment, the housing body may include an accumulator installation part and a housing extension part connected with each other. The housing extension part extends outwards relative to the accumulator installation part, the housing body is formed with a profile cavity, the profile cavity is disposed with a stop block therein, and the stop block is configured to separate the accumulator installation part from the housing extension part. The profile cavity of the accumulator installation part forms the accumulator compartment, and the profile cavity of the housing extension forms a non-accumulator compartment.

In an embodiment, an opening of the non-accumulator compartment and the accumulator placement opening are located on a same side of the housing body. When the cover plate closes the accumulator placement opening, the cover plate covers the opening of the non-accumulator compartment of the housing extension part.

In an embodiment, the stop block may include a stop body and an elastic sheet structure embedded in the stop body, the stop body is connected to a bottom of the profile cavity. The elastic sheet structure may include an elastic sheet partially extending into the accumulator compartment, the elastic sheet is arranged at a bottom of the accumulator compartment, and the elastic sheet protrudes a direction from the bottom of the accumulator compartment towards the accumulator placement opening.

The elastic sheet structure may further include an accumulator fixing part partially extending into the accumulator compartment, the accumulator fixing part is arranged between the elastic sheet and the accumulator placement opening, and the stop body is movable in the profile cavity to increase or decrease a distance between the stop block and an end of the housing body.

An accumulator (also referred to as battery) with a bump at an end thereof is configured to be installed in the accumulator compartment, the elastic sheet abuts against a bottom of the accumulator, and the accumulator fixing part abuts against a side of the bump close to the accumulator placement opening when the accumulator is installed in the accumulator compartment.

In an embodiment, a side of the accumulator compartment opposite to the accumulator placement opening is a bottom of the accumulator compartment, the bottom of the accumulator compartment is disposed with a first convex bar and a second convex bar, and a boss installation location between the first convex bar and the second convex bar. The first convex bar and the second convex bar protrudes along a direction from the bottom of the accumulator compartment towards the accumulator placement opening, and each of the first convex bar and the second convex bar is disposed with a bending block inwardly bent towards the boss installation location.

The boss installation location is disposed with a third convex bar protruding along a direction from the bottom of the accumulator compartment towards the accumulator placement opening. A protruded height of the third convex bar is less than a protruded height of each of the first convex bar and the second convex bar, and at least a side wall of the accumulator compartment is disposed with at least one fourth convex bar protruding from the side wall of the accumulator compartment to a middle of the accumulator compartment.

An accumulator is configured to be installed in the accumulator compartment and disposed with a boss, and when the accumulator is installed in the accumulator compartment, and the boss is matched with the boss installation location, the third convex bar abuts against the bottom of the accumulator, and the at least one fourth convex bar abuts against at least one side wall of the accumulator.

In an embodiment, the housing body is disposed with a first wall plate, a side of the first wall plate is disposed with a first groove, and another opposite side is disposed with a second groove and a third groove. The first wall plate forms a side wall of the accumulator compartment, and the accumulator compartment, the second groove and the third groove are sequentially arranged on a same side of the first wall plate in that order.

In an embodiment, an accumulator is configured to be installed in the accumulator compartment, the accumulator is disposed with a boss. The accumulator may include a first housing and a second housing engageable with each other, at least one of the first housing and the second housing is formed with an accumulator cell groove, the accumulator cell groove in the at least one of the first housing and the second housing forms an accumulator cell compartment when the first housing and the second housing are matched. An accumulator cell is arranged in the accumulator cell compartment, the first housing and the second housing together form a quadrate accumulator housing body having the boss protruded relative to the accumulator housing body.

The accumulator housing body may include a first side surface, a second side surface, a third side surface and a fourth side surface. The first side surface and the third side surface are arranged oppositely, and the second side surface and the fourth side surface are arranged oppositely. The boss is connected to the third side surface, two sides of the boss are connected to the third side surface, and the end surfaces at the two ends of the boss are arc-shaped surfaces.

In an embodiment, a side of the accumulator compartment is connected to an electric rolling curtain control box, a circuit board is arranged in the electric rolling curtain control box, and the circuit board is electrically connected to the accumulator in the accumulator compartment.

In another aspect, the disclosure further provides an electric rolling curtain, which may include the above-mentioned rolling curtain mounting housing, a motor assembly and a roller, and the motor assembly is configured to drive the roller to rotate.

In an embodiment, the electric rolling curtain may further include an accumulator and a curtain body wound on the roller, the accumulator is detachably installed in the accumulator compartment, the accumulator is electrically connected to the motor assembly, and an end of the curtain body is capable of extending and retracting during a rotation of the roller. When the electric rolling curtain is at an initial state of accumulator replacement, the end of the curtain body is located at an initial position. When the electric rolling curtain is at a retracting state during operation, the end of the curtain body is located at a first position. When the electric rolling curtain is at an extending state during operation, the end of the curtain body is located at a second position, and the first position and the second position both are lower than the initial position.

In an embodiment, when the end of the curtain body is located at the first position, the end of the curtain body is lower than the bottom of the roller; or, when the end of the curtain body is at the first position, the end of the curtain body is flush with the bottom of the roller.

In an embodiment, during switching to the initial state of accumulator replacement, the curtain body is driven to retract, and when it sensed that the end of the curtain body is located at the initial position, the curtain body is driven to stop retracting.

Alternatively, there is a gap between the roller and the rolling curtain mounting housing, a diameter of the end of the curtain body is greater than the gap, so that the end of the curtain body is limited to outside the gap. The curtain body is driven to retract during switching to the initial state of accumulator placement, and the curtain body is driven to stop retracting and the end of the curtain body is located at the initial position when it is sensed that a retracting resistance is greater than a preset value.

In an embodiment, the electric rolling curtain may further include an electric rolling curtain control box. The electric rolling curtain control box is arranged at an end of the housing body, the rolling curtain mounting housing and the motor assembly are installed on a same side of the electric rolling curtain control box. The electric rolling curtain control box is connected to the accumulator compartment and the motor assembly individually, at least an end of the roller is hollow to allow the motor assembly to be inserted into the roller. When the motor assembly is working, the motor assembly is configured to drive the roller to rotate relative to the rolling curtain mounting housing.

In an embodiment, an accumulator connection port is arranged at an end of the electric rolling curtain control box close to the rolling curtain mounting housing, the accumulator connection port is connected to the accumulator compartment. A first charging port is arranged at an end of the electric rolling curtain control box close to the motor assembly, and the accumulator connection port, a circuit board and the first charging port are sequentially connected in that order, and the circuit board is arranged in the electric rolling curtain control box. The electric rolling curtain may further include an accumulator configured to be installed in the accumulator compartment. When the accumulator is installed in the accumulator compartment, an end of the accumulator close to the electric rolling curtain control box is disposed with a second charging port and a circuit connection port, and the circuit connection port is configured to be connected to the electric rolling curtain control box.

In an embodiment, the electric rolling curtain control box may include a first inserting plate, a second inserting plate and a third inserting plate. The first inserting plate, the second inserting plate and the third inserting plate extend towards the rolling curtain mounting housing. The rolling curtain mounting housing may include a first wall plate, a side of the first wall plate is disposed with a first groove, and another opposite side is disposed with a second groove and a third groove. The first wall plate forms a side wall of the accumulator compartment, the accumulator compartment, the second groove and the third groove are sequentially arranged on a same side of the first wall plate in that order. The first inserting plate is inserted into the first groove, the second inserting plate is inserted into the second groove, and the third inserting plate is inserted into the third groove.

In an embodiment, the electric rolling curtain control box may include a circuit board, a first outer housing and a second outer housing, and the first outer housing is closer to the roller than the outer second housing. A motor fixing part partially inserted into the roller is arranged on a side of the first outer housing, a motor fixing groove partially inserted into the roller is arranged on the motor assembly, and the motor fixing part is inserted into the motor fixing groove. A circuit board accommodating cavity is disposed between the first outer housing and the second outer housing or on the first outer housing, the circuit board is arranged in the circuit board accommodating cavity. The circuit board accommodating cavity is disposed with a circuit outlet. The second outer housing is detachably sleeved on a side of the first outer housing away from the roller, and when the second outer housing is sleeved on the side of the first outer housing away from the roller, the second outer housing shields the circuit outlet.

In an embodiment, the motor assembly comprises a fixing member, a tubular motor housing, a motor, a rotating shaft and a connecting sleeve. The motor and the rotating shaft are connected with each other and located inside the tubular motor housing. The fixing member is installed at an end of the tubular motor housing, a part of the fixing member extends into the tubular motor housing, the part of the fixing member extending into the tubular motor housing is disposed with a motor fixing groove, and the rotating shaft is connected to the connecting sleeve and configured to drive the connecting sleeve to rotate. The connecting sleeve is installed at another end of the tubular motor housing, and a part of the connecting sleeve outside the tubular motor housing is connected to the roller and configured to drive the roller to rotate.

In an embodiment, the electric rolling curtain may further include an accumulator, the accumulator is configured to be detachably installed in the accumulator compartment and electrically connected to the motor assembly; the rolling curtain mounting housing and/or the roller shake(s) when the accumulator is installed in the accumulator compartment and in electrical conduction with the motor assembly. Alternatively, the roller rotates when the accumulator is installed in the accumulator compartment and connected to the motor assembly.

Compared with the prior art, the embodiments of the disclosure mainly have the following beneficial effects: the electric rolling curtain provided by the disclosure is more convenient to replace the accumulator.

BRIEF DESCRIPTION OF DRAWINGS

The above-mentioned objectives, features and advantages of the disclosure will become clearer through a more specific description of the illustrated embodiment of the disclosure shown in the accompanying drawings. In all the drawings, the same reference numerals indicate the same parts, and the drawings are not deliberately scaled to the actual size, with the focus on showing the main purpose of the disclosure.

DESCRIPTION OF REFERENCE SIGNS

Figure 1:
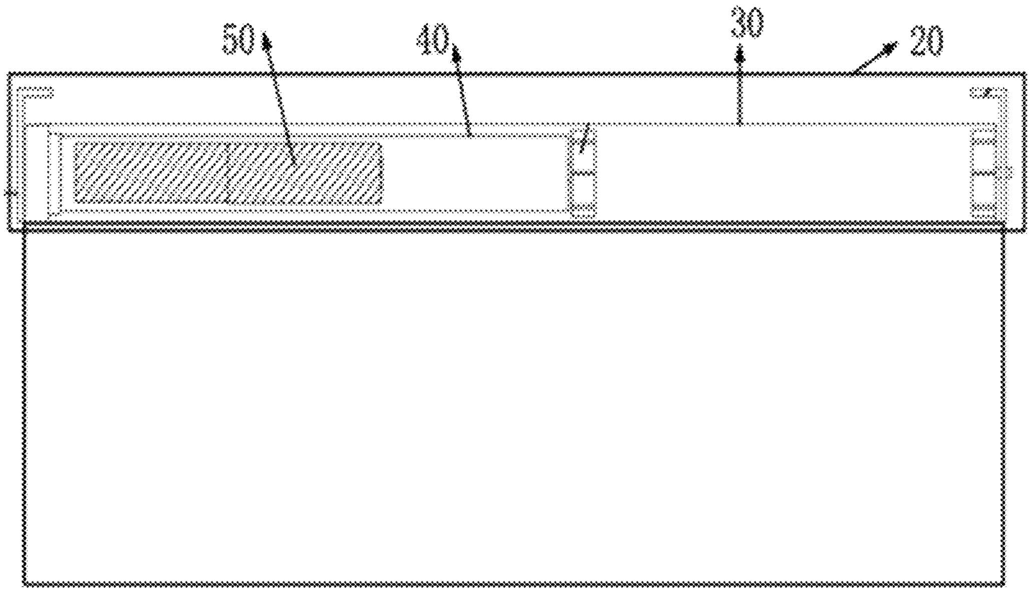
FIG. 1 (Prior Art)
FIG. 1 is a schematic structural view of a curtain structure in which an accumulator is installed in a motor in the prior art.

1. Rolling curtain mounting housing; 2. Electric rolling curtain control box; 3. Motor assembly; 1111. Accumulator compartment; 6. Curtain body; 12. Cover plate; 113. Profile cavity; 114. Stop block; 1141. Stop body; 1142. Elastic sheet structure; 1143. Elastic sheet; 1144. Accumulator fixing part; 5. Accumulator; 51. Circuit connection port; 52. Bump; 57. Boss; 1113. First convex bar; 1114. Second convex bar; 1115. Third convex bar; 1116. Fourth convex bar; 53. First housing; 54. Second housing; 55. Accumulator cell; 56. Accumulator cell compartment; 501. First side surface, 502, Second side surface; 503. Third side surface; 504. Fourth side surface; 571. Arc-shaped surface; 58. Accumulator key; 59. Second charging port; 21. First outer housing; 22. Second outer housing; 23. Motor fixing part; 31. Motor fixing groove; 24. Circuit board accommodating cavity; 211. First outer housing body; 212. Second outer housing body; 25. Accumulator connection port; 26. First charging port; 201. First inserting plate; 202. Second inserting plate; 203. Third inserting plate; 101. First wall plate; 102. First groove; 103. Second groove; 104. Third groove; 32. Fixing member; 33. Tubular motor housing; 34. Connecting sleeve; **2*a*. End mounting seat; 113*a*. Accumulator compartment sealing plate; 121. First opening; 122. Second opening; 13. Top baffle; 14. Front baffle; 15**. Mounting cavity

DETAILED DESCRIPTION OF EMBODIMENTS

In order to facilitate the understanding of the disclosure, the disclosure will be described more comprehensively below with reference to the accompanying drawings.

It should be noted that when an element is considered to "connect to" another element, it can be directly connected to and integrated with another element, or there may be intermediate elements at the same time. The terms "installation", "an end", "another end" and similar expressions used herein are for illustrative purposes only.

Unless otherwise defined, all technical and scientific terms used herein have the same meanings as those commonly understood by those skilled in the related art. The terms used in the description herein are only for the purpose of describing specific embodiments and are not intended to limit the disclosure. The term "and/or" as used herein includes any and all combinations of one or more related listed items.

Referring to FIGS. 2-25, an embodiment of the disclosure provides an electric rolling curtain, which may include a rolling curtain mounting housing 1, an electric rolling curtain control box 2 (also referred to as control box), a motor assembly 3, an accumulator 5 (also referred to as battery), a roller 4 and a curtain body 6 wound on the roller 4. A motor is arranged in the motor assembly 3, and the accumulator 5 is configured to be installed in an accumulator compartment 1111. The rolling curtain mounting housing 1 may include a housing body 11, and the housing body 11 may include an accumulator installation part and a housing extension part connected with each other. The housing extension part extends outwards relative to the accumulator installation part, that is, the housing extension part extends towards another end not connected to the accumulator installation part. The accumulator installation part is disposed with the accumulator compartment 1111, the accumulator compartment 1111 is disposed with an accumulator placement opening, and the accumulator is inserted into the accumulator compartment 1111 through the accumulator placement opening. The electric rolling curtain control box 2 is arranged at an end of the accumulator installation part away from the housing extension part and outside the accumulator compartment 1111. The rolling curtain mounting housing 1 and the motor assembly 3 are installed on a same side of the electric rolling curtain control box 2. An end of the electric rolling curtain control box 2 is connected to the accumulator compartment 1111, and another end of the electric rolling curtain control box 2 is connected to the motor assembly 3. At least one end of the roller 4 is hollow, the motor assembly 3 is located outside the accumulator compartment 1111 and is capable of being inserted into the roller 4. When the motor assembly 3 is working, it can drive the roller 4 to rotate relative to the rolling curtain mounting housing 1, and the curtain body 6 is capable of extending and retracting under a rotation of the roller 4.

The rolling curtain mounting housing 1 provided in the illustrated embodiment can also be referred to as a rolling curtain cover, the accumulator compartment 1111 can also be referred to as an accumulator mounting compartment, and the housing body 11 can also be referred to as a cover body.

Referring to FIGS. 17-20, in an embodiment, the housing body 11 (cover body) may further include a top baffle 13 and a front baffle 14. The top baffle 13 is configured to connect and fix the whole rolling curtain with the outside, an end of the top baffle 13 is connected to a side of the housing body 11 (cover body), and an upper end of the front baffle 14 is connected to the housing body 11 (cover body). The top baffle 13, the housing body 11 (cover body) and the front baffle 14 are sequentially connected to form a semi-enclosed mounting cavity 15 in that order, and the mounting cavity 15 is configured to accommodate the roller 4. The roller 4 is arranged in the rolling curtain mounting housing 1 (rolling curtain cover), and a motor is arranged in the roller 4. The mounting cavity 15 formed by a sequential connection of the top baffle 13, the housing body 11 (cover body) and the front baffle 14 not only provides an accommodation space for the roller 4 of the rolling curtain, but also the front baffle 14 shields an internal structure of the housing body 11 (cover body), making the overall appearance of the rolling curtain simpler and more beautiful. By setting the accumulator compartment 1111 (accumulator mounting compartment) on the cover, an independent accommodation space is provided for the accumulator 5. When the accumulator runs out, only the accumulator 5 needs to be replaced without replacing the motor, which makes the later maintenance of the rolling curtain more convenient and saves the maintenance cost.

Figure 17:
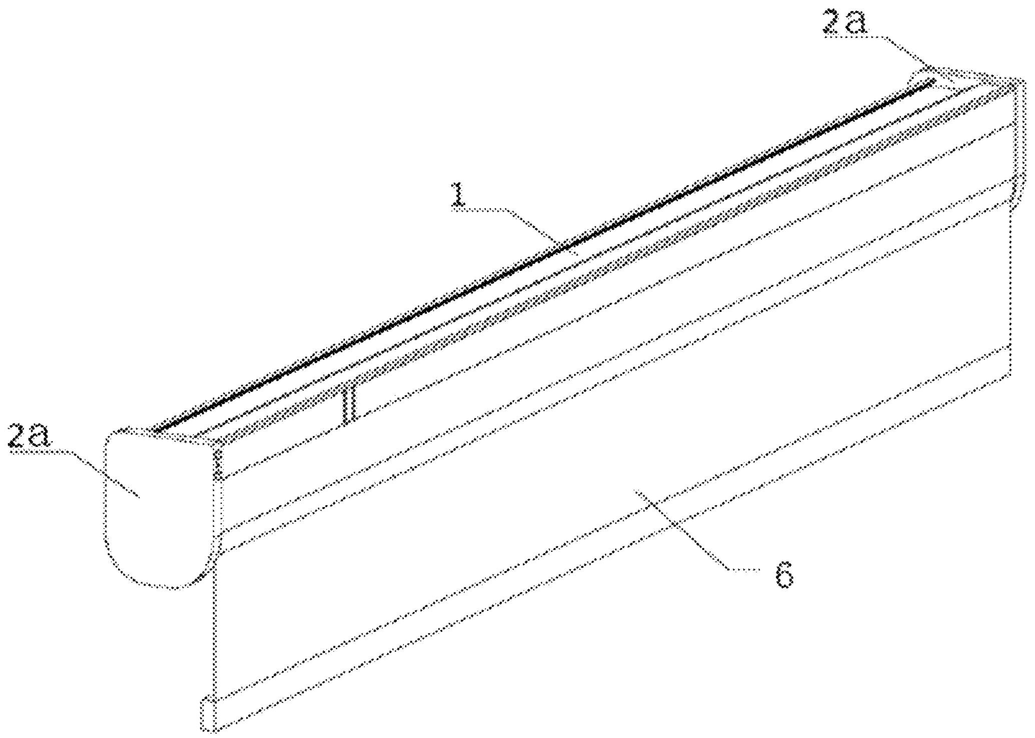
FIG. 17 is a perspective view of the electric rolling curtain according to an embodiment of the disclosure.
Figure 18:
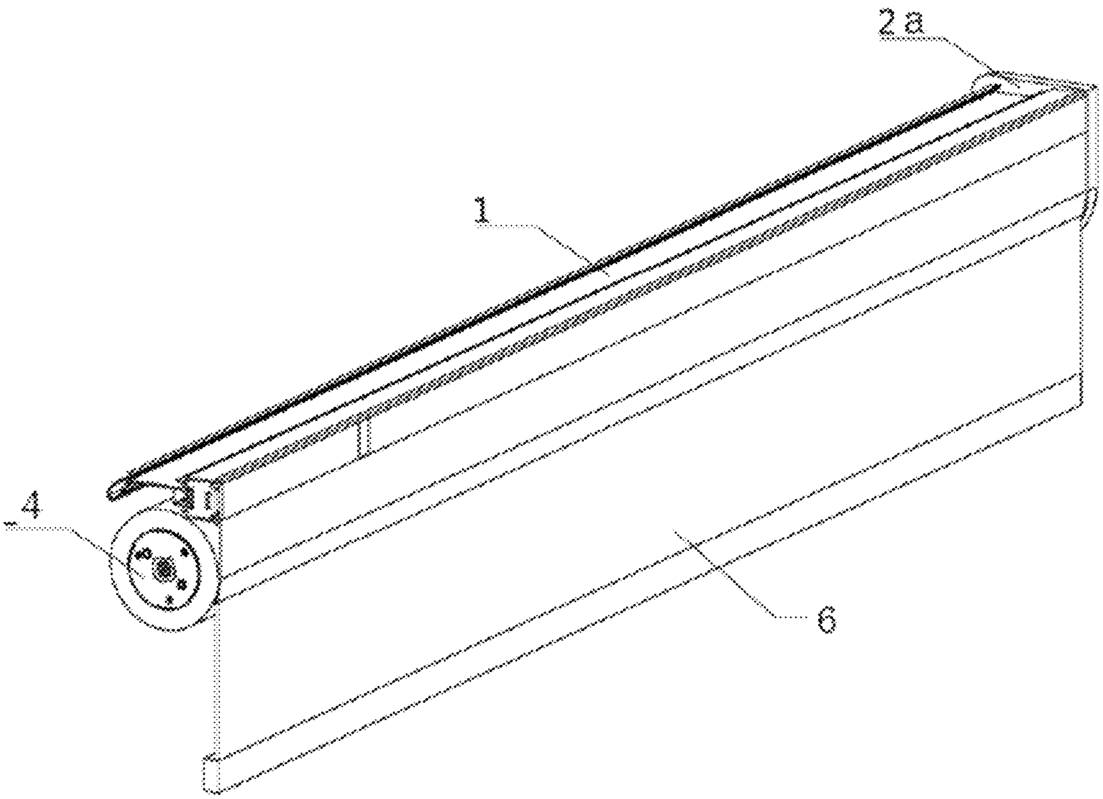
FIG. 18 is another perspective view of the electric rolling curtain (whose one end mounting seat is omitted) according to an embodiment of the disclosure.

Referring to FIG. 17, in an embodiment, there are two end mounting seats **2*a* at two ends of the rolling curtain mounting housing 1 (rolling curtain cover), an end mounting seat 2*a* close to an end of the accumulator compartment 1111 can be an electric rolling curtain control box 2** with an internal circuit.

Figure 19:
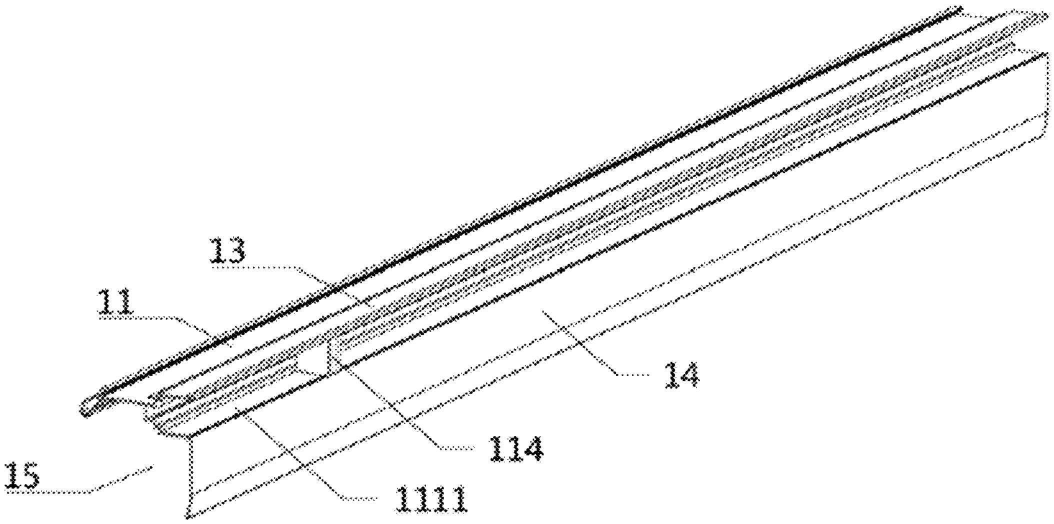
FIG. 19 is a perspective view showing the electric rolling curtain mounting housing and the stop block according to an embodiment of the disclosure.
Figure 20:
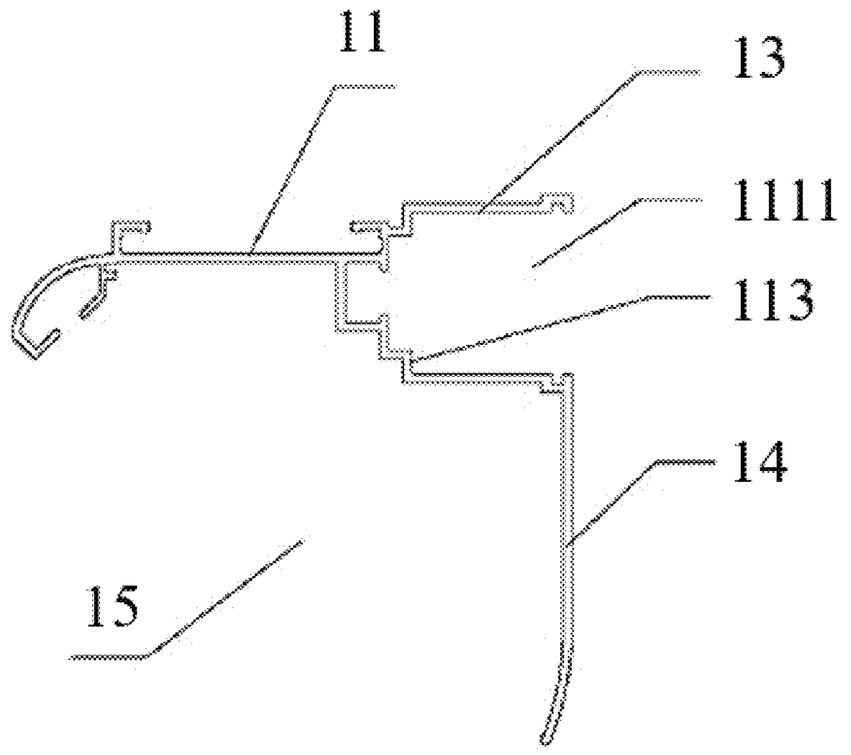
FIG. 20 is a side view of the rolling curtain mounting housing according to an embodiment of the disclosure.
Figure 21:
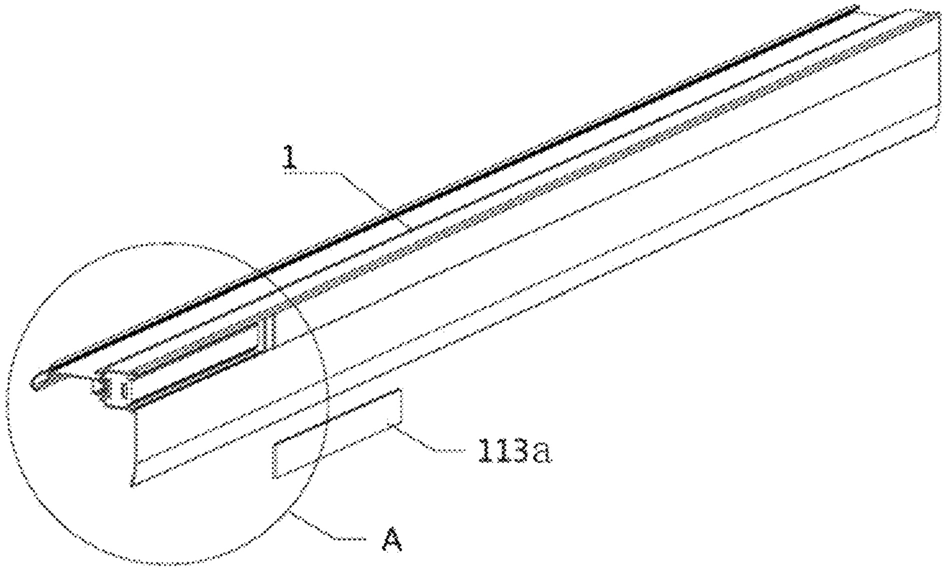
FIG. 21 is a schematic exploded structural view of the rolling curtain mounting housing (on which the accumulator and an accumulator compartment sealing plate are installed) according to an embodiment of the disclosure.

Referring to FIGS. 19-21, in an embodiment, the rolling curtain mounting housing 1 (rolling curtain cover) is integrally formed. The rolling curtain mounting housing 1 (rolling curtain cover) is a profile material with an opening on a side. The profile material is formed with a profile cavity 113, and a part of the profile cavity 113 forms an accumulator compartment 1111 (accumulator mounting compartment). A stop block 114 is arranged in the profile cavity 113, and a distance between the stop block 114 and the end mounting seat **2*a* (electric rolling curtain control box 2) matches a length of the accumulator, so that the accumulator can be fixed into the accumulator compartment 1111 (accumulator mounting compartment). The housing body 11 (cover body) is disposed with a recess, and the top baffle 13 is located above the recess to form the profile cavity 113**.

Figure 22:
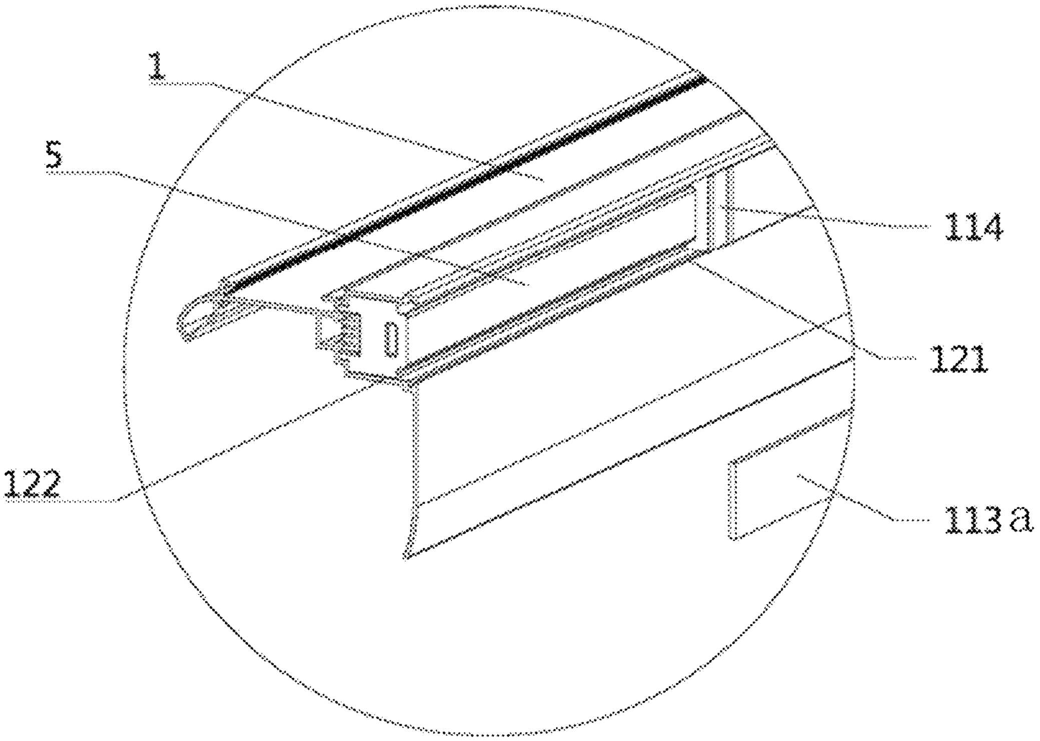
FIG. 22 is a schematic enlarged view of portion A in FIG. 20.

Referring to FIG. 22, in an embodiment, the accumulator compartment 1111 (accumulator mounting compartment) is disposed with a first opening 121 and a second opening 122. The opening of the first opening 121 faces an operating surface, and the operating surface is a plane of the front baffle 14. The opening of the second opening 122 faces a side mounting surface, which is the plane of the end mounting seat 2*a* of the rolling curtain. The first opening 121 is an accumulator placement opening for accumulator replacement during later maintenance, the opening of the first opening 121 faces the plane where the front baffle 14 is located, which is convenient for the user to replace the accumulator from the front of the rolling curtain. The second opening 122 is configured to connect the accumulator and the motor in the motor assembly, the opening of the second opening 122 is arranged towards the plane where the end mounting seat 2*a* of the rolling curtain is located, so that the circuit connecting the accumulator and the motor can be hidden on a side surface of the rolling curtain housing 1, so as to avoid the circuit from being exposed and easy to be damaged, and make the appearance of the rolling curtain more concise and beautiful. The end mounting base 2*a* near one end of the accumulator compartment 1111 is the electric rolling curtain control box 2 with the internal circuit, which is disposed with a motor power interface and an accumulator interface, and the motor power interface and the accumulator interface are connected through a line, which is hidden in the electric rolling curtain control box 2. When the accumulator is connected to the accumulator interface and the motor is connected to the motor power interface, the accumulator is connected to the motor and supplies power to the motor.

The electric rolling curtain provided in the illustrated embodiment realizes the electrical connection between the accumulator and the motor assembly 3 through the electric rolling curtain control box 2 outside the accumulator compartment 1111, and sets the motor assembly 3 outside the accumulator compartment 1111, which can make the motor thin and short, more convenient for the production of the motor and reduce the cost. At the same time, after thinning the motor, it can also better realize the preparation of short curtain, reduce the restriction of long motor on the length of rolling curtain rod, realize that the electric rolling curtain can be applied to smaller windows, and expand the application market of electric rolling curtain.

Figure 16:
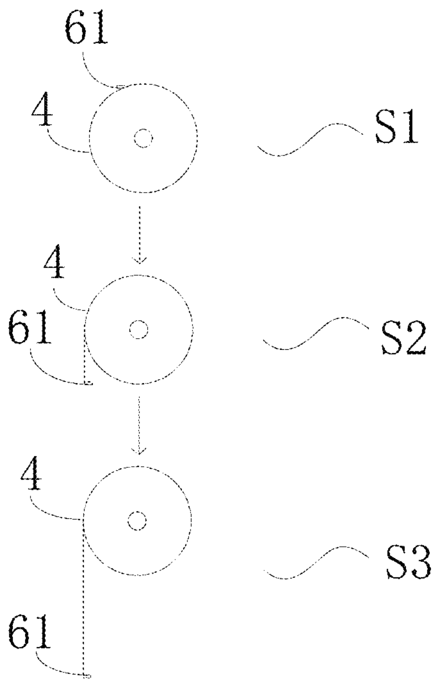
FIG. 16 is a schematic view of a retracting state and an extending state of a curtain body according to an embodiment of the disclosure.

Referring to FIG. 16, the electric rolling curtain provided by the illustrated embodiment includes the following states:

S1 is the initial state of accumulator replacement, the curtain body is reset, and the end 61 of the curtain body is located at the initial position;

S2 is the retracting state during operation, the end 61 of the curtain body is located at the first position;

S3 is the extending state during operation, and the end 61 of the curtain body is located at the second position; and when the electric curtain is working, the end of the curtain body is located at the first position or the second position. There is no sequential relationship between the retracting state and the extending state in the illustrated embodiment. In the process of use, it can be from the extending state to the telescopic state, or from the extending state to the retracting state, which is not specifically limited.

When the electric rolling curtain is working, the accumulator 5 will need to be replaced. When the accumulator 5 is installed in the empty accumulator compartment 1111 and connected to the motor assembly 3, the curtain body will automatically reset. That is, in the initial state of accumulator placement, the curtain body automatically resets, and the end of the curtain body is located at the initial position. That is, each time the accumulator 5 is replaced, the curtain body will automatically reset so that the end 61 of the curtain body is located at the initial position. After the accumulator is replaced, the end 61 of the curtain body is located at the initial position, the electric rolling curtain is at the working state, and the curtain body at the working state may be retracted or extended. In the retracting state during operation, the end of the curtain body is located at the first position. In the extending state during operation, the end of the curtain body is located at the second position, and both the first position and the second position are lower than the initial position. That is, when the electric rolling curtain is working, the end of the curtain body is always lower than the initial position.

The electric rolling curtain provided in the illustrated embodiment can automatically reset the curtain body to a higher position and correct the retracted position of the curtain body every time the accumulator is replaced. It solves the problem that the curtain body is pulled artificially in the process of use, resulting in that the curtain body cannot be fully retracted, and also solves the problem that the position of the curtain body gradually shifts in the process of use.

The electric rolling curtain provided by the illustrated embodiment, in the working state, the highest position at which the curtain body can be retracted is lower than the reset initial position, which can avoid that each retracted position is higher in the working process, which may cause the rolling curtain to separate from the roller. At the same time, it can also avoid the problem of high-power consumption due to the high retracted position each time in the use process. When the accumulator is replaced each time and the curtain body is reset, the end 61 of the curtain body is located at the initial position closer to the top of the roller 4. It can correct the position offset of the electric rolling curtain, and the user experience is good.

In an illustrated embodiment, when the end of the curtain body is located at the first position, the end of the curtain body is lower than the bottom of the roller. Alternatively, when the end of the curtain body is located at the first position, the end of the curtain body is flush with the bottom of the roller. In the working state, the curtain body can cover the side surface of the roller even if it is completely retracted. It can make the side surface of the roller not be observed by the user during the use of the electric rolling curtain, and the aesthetics is better.

In an illustrated embodiment, a position sensor is arranged on the roller 4 to sense whether the end of the curtain body is located at the initial position. In the initial state of accumulator replacement, the curtain body performs rolling reset. When the position sensor is sensed that the end of the curtain body is located at the initial position, the curtain body stops retracting and the reset is completed.

In another illustrated embodiment, there is a gap between the roller and the rolling curtain mounting housing. The diameter of the end of the curtain body is greater than the gap, so that the end of the curtain body is limited outside the gap. In the initial state of accumulator replacement, the curtain body is retracted and reset. When it is sensed that the resistance of retraction is greater than the preset value, it indicates that the end of the curtain body has been limited to outside the gap and cannot continue to retract. At this time, the curtain body stops retracting, and the end of the curtain body is located at the initial position.

Figure 2:
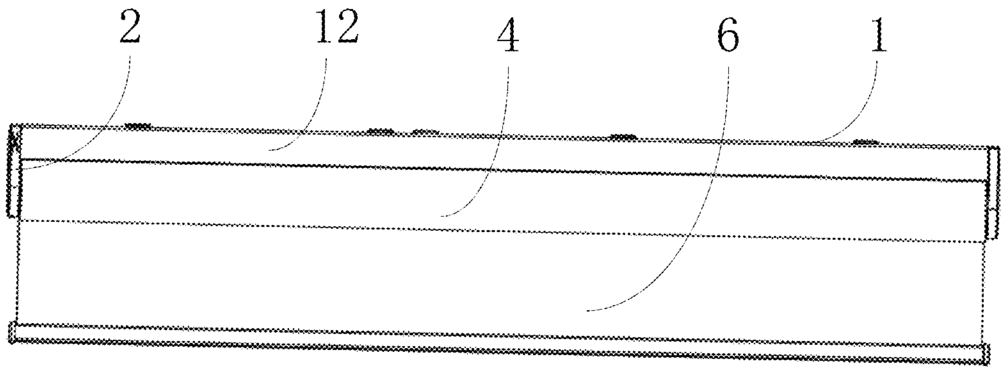
FIG. 2 is a schematic view of an overall structure of an electric rolling curtain according to an embodiment of the disclosure.

Referring to FIG. 2, in an illustrated embodiment, the rolling curtain mounting housing 1 is further disposed with a cover plate 12, which is configured to close the accumulator placement opening. When the cover plate 12 closes the accumulator placement opening, the cover plate 12 covers the side surface of the extension of the housing on the same side as the accumulator placement opening. In the illustrated embodiment, the accumulator compartment 1111 and the housing extension are covered by the cover plate 12 at the same time, so that the rolling curtain mounting housing 1 has stronger integrity and better aesthetics. Referring to FIG. 21, in another illustrated embodiment, an accumulator compartment sealing plate 113*a* is arranged on the rolling curtain mounting housing 1 (rolling curtain cover), which can avoid easy damage of the accumulator due to exposure, and can prevent accidents caused by the accumulator separating from the accumulator compartment 1111 (accumulator mounting compartment) during use.

Referring to FIG. 2, in an illustrated embodiment, an end of the cover plate 12 is hinged to the accumulator installation part and the housing extension part, and another end of the cover plate can close or open the accumulator placement opening. In the illustrated embodiment, it is easier to open and close the cover plate 12 through the hinge of the cover plate 12.

Referring to FIGS. 3-6, in an illustrated embodiment, the housing body 11 is formed with a profile cavity 113, the opening of the profile cavity 113 is on the same side as the accumulator placement opening. The profile cavity 113 is disposed with a stop block 114, the stop block 114 is configured to separate the accumulator installation part from the housing extension part. The profile cavity 113 of the accumulator installation part forms the accumulator compartment 1111, and the profile cavity of the housing extension part forms a non-accumulator compartment. The opening of the non-accumulator compartment and the accumulator placement opening are located on the same side of the housing body. When the cover plate 12 closes the accumulator placement opening, the cover plate 12 covers the profile cavity 113 of the housing extension part, that is, the cover plate 12 covers the opening of the non-accumulator compartment. In the illustrated embodiment, the housing body 11 is integrally formed and formed with a profile cavity 113. The stop block 114 is arranged in the profile cavity 113, and the stop block 114 is configured to limit the length of the accumulator compartment 1111 so that a part of the profile cavity 113 forms the accumulator compartment 1111. The cover plate 12 in the illustrated embodiment can cover the accumulator compartment 1111 and the profile cavity 113 of the housing extension part at the same time, so that the overall aesthetics of the rolling curtain mounting housing 1 is greater.

Figure 3:
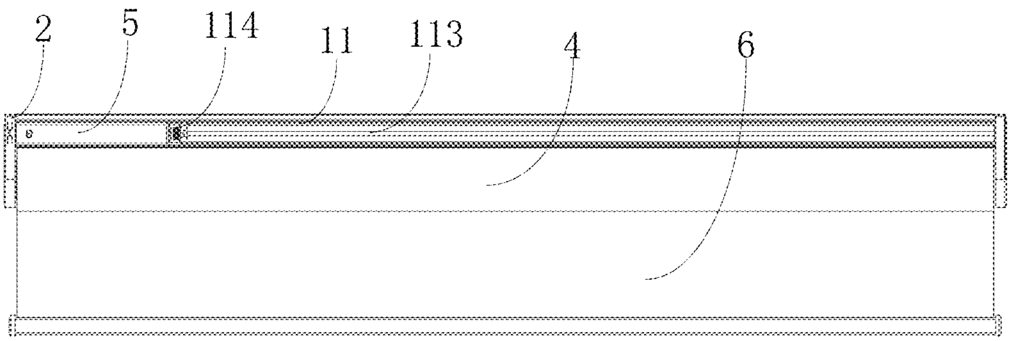
FIG. 3 is a schematic structural view of the electric rolling curtain after an accumulator is installed therein according to an embodiment of the disclosure.

Referring to FIG. 2 and FIG. 3, in an illustrated embodiment, the opening of the profile cavity 113, that is, the accumulator placement opening, faces the operating surface, making it easier to replace the accumulator. At the same time, in conjunction with the cover plate 12 of the illustrated embodiment, the closure and hiding of the profile cavity 113 is better realized, making the overall aesthetics of the operating surface of the rolling curtain mounting housing 1 greater. In the illustrated embodiment, the operating surface is the side facing the installer after the installation of the electric rolling curtain. In an illustrated embodiment, the electric rolling curtain control box 2 is disposed with at least one of a control key and a wireless control device, and the user can send a signal to the wireless control device through a remote controller to control the electric rolling curtain. The plane of the accumulator placement opening is parallel to the mounting surface of the at least one of the control key and the wireless control device. In an illustrated embodiment, the plane of the accumulator placement opening is parallel to the extension surface of the curtain body 6 of the electric rolling curtain.

Figure 6:
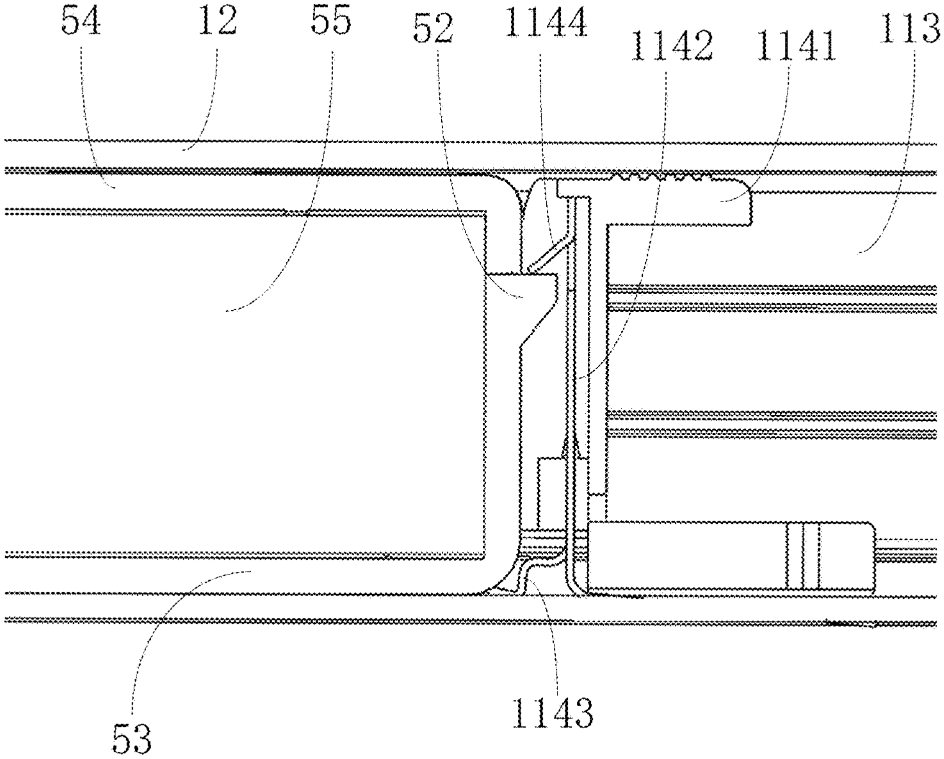
FIG. 6 is a schematic structural view of a stop block and the accumulator matched in the accumulator compartment according to an embodiment of the disclosure.
Figure 7:
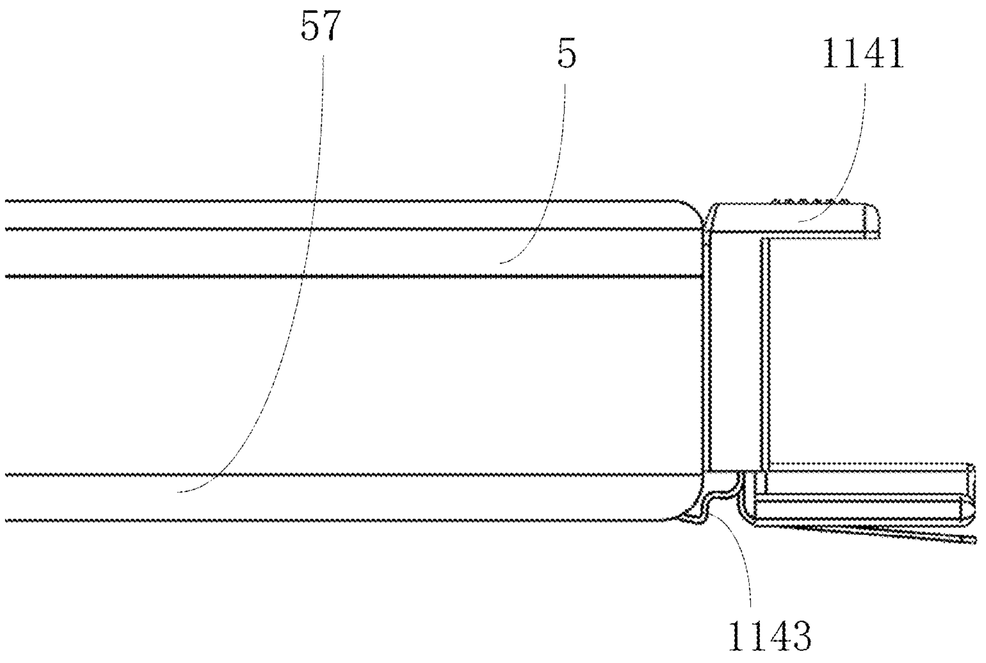
FIG. 7 is a schematic structural view of a matching between the stop block and the accumulator according to an embodiment of the disclosure.

Referring to FIG. 6 and FIG. 7, in an embodiment, the stop block 114 includes a stop body 1141 and an elastic sheet structure 1142 embedded in the stop body 1141. The elastic sheet structure 1142 partially extends into the accumulator compartment, and the stop body 1141 is connected to the profile cavity 113. In the illustrated embodiment, the stop body 1141 and the profile cavity 113 can be fixedly connected, or the stop body 1141 can move along the profile cavity 113. The elastic sheet structure 1142 includes an elastic sheet 1143 partially extending into the accumulator compartment 1111 and an accumulator fixing part 1144. The elastic sheet 1143 is arranged at the bottom of the accumulator compartment 1111, the elastic sheet 1143 protrudes upward from the bottom of the accumulator compartment 1111, and the accumulator fixing part 1144 is arranged between the elastic sheet 1143 and the accumulator placement opening. In the illustrated embodiment, the elastic sheet 1143 is a metal sheet with certain elasticity. The elastic sheet 1143 protrudes along a direction from the bottom of the accumulator compartment 1111 towards the accumulator placement opening, so that when the accumulator 5 is installed into the accumulator compartment, the elastic sheet 1143 abuts against the bottom of the accumulator 5, so that the accumulator can be easily taken out. The accumulator fixing part is arranged between the elastic sheet and the accumulator placement opening.

Referring to FIGS. 3-4 and FIGS. 6-10, in an illustrated embodiment, an end of the accumulator 5 is disposed with a circuit connection port 51, and another end is disposed with a bump 52. When the accumulator 5 is installed in the accumulator compartment 1111, the circuit connection port 51 is connected to the electric rolling curtain control box 2, so that the accumulator 5 outputs power to the electric rolling curtain control box 2, or the electric rolling curtain control box 2 charges the accumulator 5. When the accumulator 5 is installed in the accumulator compartment 1111, the elastic sheet 1143 abuts against the bottom of the accumulator 5, and the accumulator fixing part 1144 abuts against the side of the bump 52 close to the accumulator placement opening. The bottom of the accumulator 5 in the illustrated embodiment refers to the side where the accumulator 5 is inserted and installed into the accumulator compartment 1111 and contacts the bottom of the accumulator compartment 1111, and the bottom of the accumulator compartment 1111 is the side opposite to the accumulator placement opening. The accumulator fixing part 1144 can move in the profile cavity 113 to increase or decrease the distance between the stop block 114 and the end of the housing body 11, so as to change the capacity of the accumulator compartment 1111 and adjust the accumulator length. When the accumulator 5 is inserted and installed into the accumulator compartment 1111, the accumulator fixing part 1144 abuts against an upper part of the bump 52 to better fix the accumulator 5 in the accumulator compartment 1111. The upper part of the bump 52 in the illustrated embodiment refers to the side of the bump 52 close to the opening of the accumulator compartment 1111.

Referring to FIGS. 7-10 and 15, in an illustrated embodiment, a boss 57 is arranged on the side where the accumulator 5 is connected to the bottom of the accumulator compartment 1111, and the bottom of the accumulator compartment 1111 in the illustrated embodiment refers to the side opposite to the accumulator placement opening. The bottom of the accumulator compartment 1111 is disposed with a first convex bar 1113 and a second convex bar 1114. There is a boss installation location between the first convex bar 1113 and the second convex bar 1114. The first convex bar 1113 and the second convex bar 1114 protrudes along a direction from the bottom of the accumulator compartment 1111 towards the accumulator placement opening, and are disposed with bending blocks inwardly bent towards the boss installation location respectively. When the accumulator 5 is installed in the accumulator compartment 1111, The boss 57 is inserted into the boss installation location, and the boss 57 matches with the boss installation location to better install the accumulator 5 in the accumulator compartment 1111.

Figure 15:
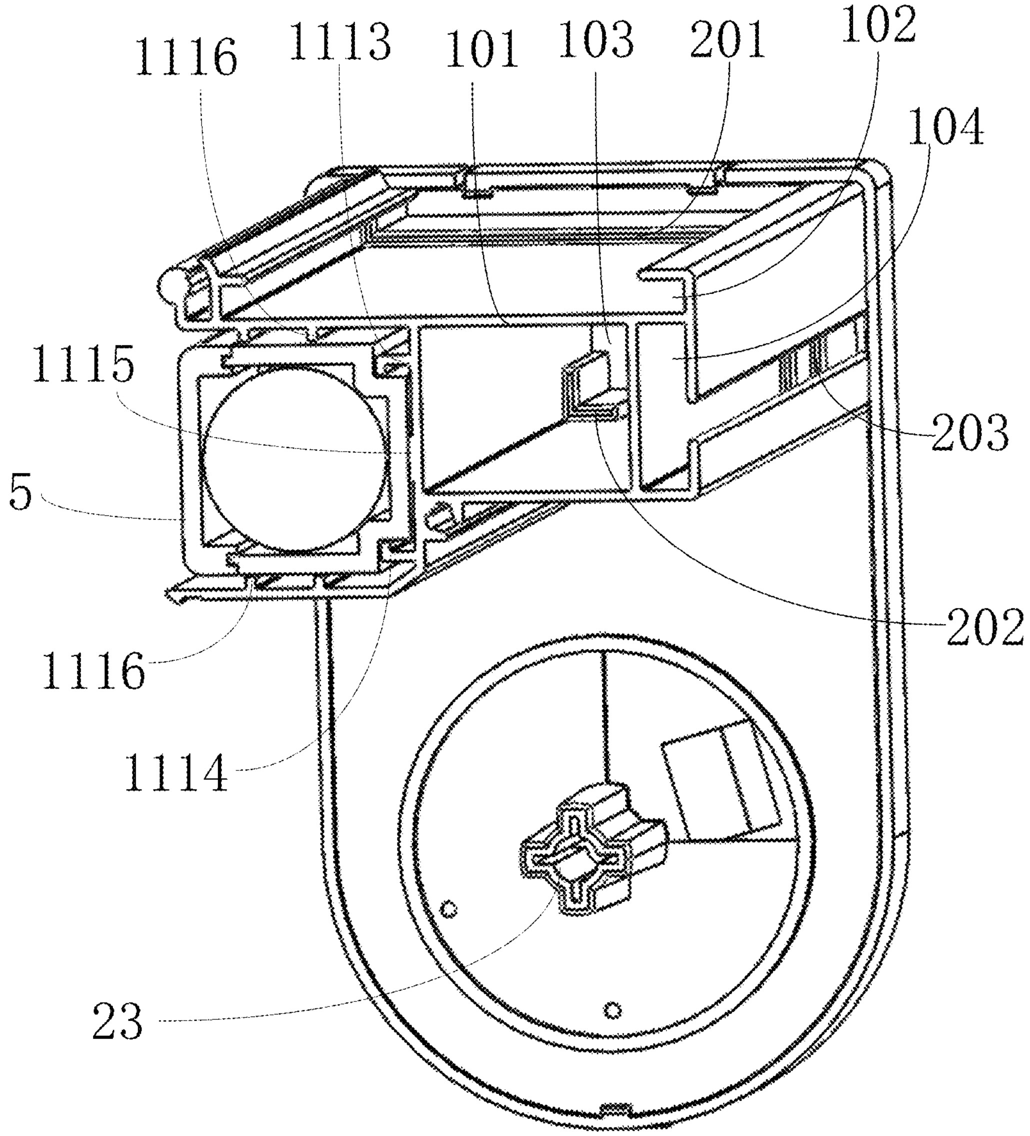
FIG. 15 is a schematic cross-sectional structural view showing the rolling curtain mounting housing and the electric rolling curtain control box being matched according to an embodiment of the disclosure.

Referring to FIG. 15, in an illustrated embodiment, the boss installation location is further disposed with a third convex bar 1115 protruding along a direction from the bottom of the accumulator compartment 1111 towards the accumulator placement opening. The upward protruded height of the third convex bar 1115 is less than the upward protruded height of each of the first convex bar 1113 and the second convex bar 1114, which can contact the bottom of the accumulator 5 and avoid the difficulty of taking out the accumulator 5. Two sides of the accumulator compartment 1111 are further disposed with at least one fourth convex bar 1116 protruding from the side wall of the accumulator compartment 1111 to the middle of the accumulator compartment 1111. When the accumulator 5 is installed in the accumulator compartment 1111, the third convex bar 1115 abuts against the bottom of the accumulator 5, and the at least one fourth convex bar 1116 abut against at least one side wall of the accumulator 5. The contact area between the accumulator 5 and the side wall of the accumulator compartment 1111 is reduced to make the accumulator 5 easy to take out.

Figure 8:
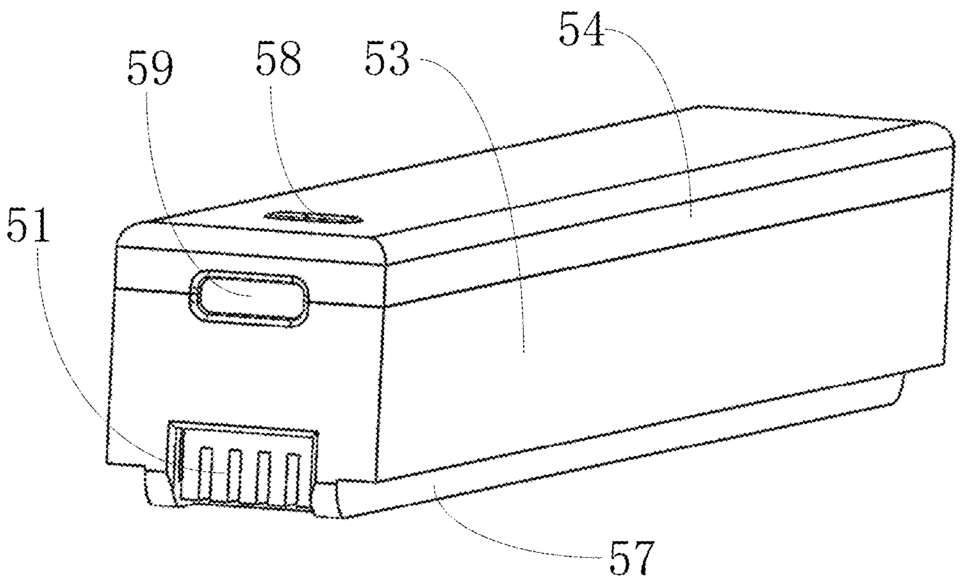
FIG. 8 is a schematic structural view from an angle of the accumulator according to an embodiment of the disclosure.
Figure 9:
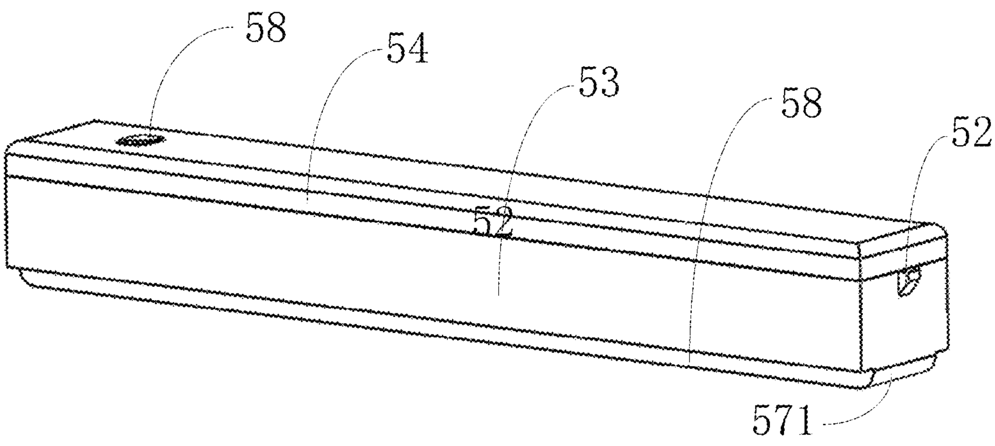
FIG. 9 is a schematic structural view from another angle of the accumulator according to an embodiment of the disclosure.
Figure 10:
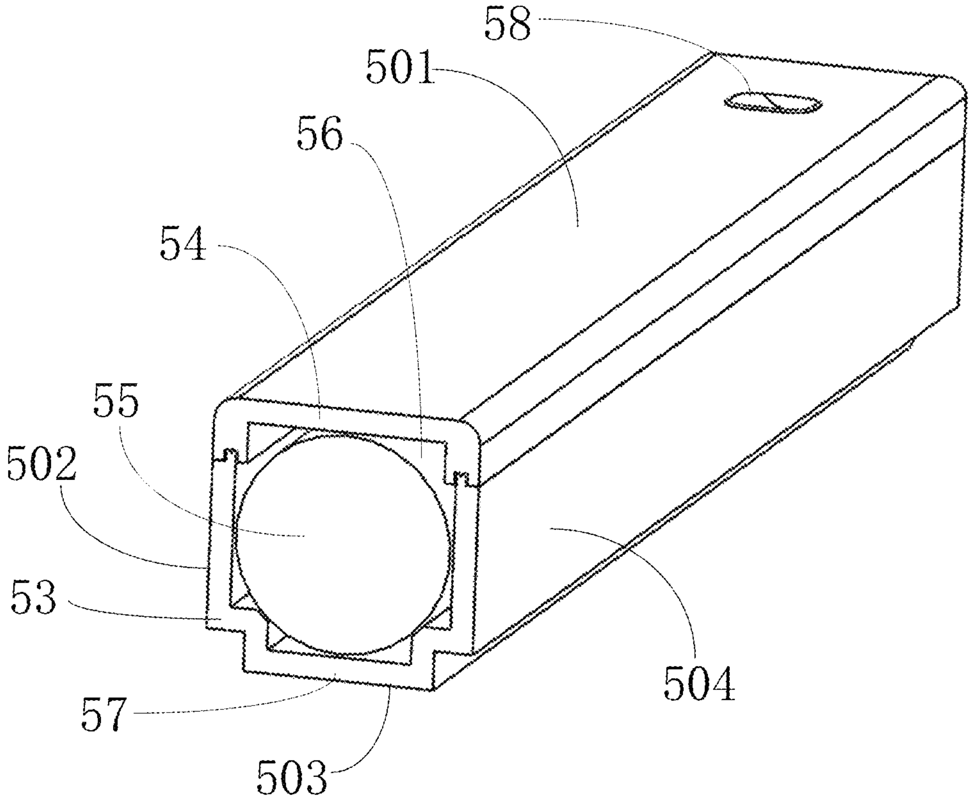
FIG. 10 is a schematic cross-sectional structural view of the accumulator according to an embodiment of the disclosure.

Referring to FIGS. 8-10, in an illustrated embodiment, the accumulator 5 is a quadrate accumulator 5, and the accumulator 5 includes a first housing 53 and a second housing 54. At least one of the first housing 53 and the second housing 54 is formed an accumulator cell groove, for example, the first housing 53 is formed the accumulator cell groove, the second housing 54 is configured to cover the opening of the accumulator cell groove, or the second housing 54 is formed the accumulator cell groove, the first housing 53 is configured to cover the opening of the accumulator cell groove, or both the first housing 53 and the second housing 54 are formed the accumulator cell groove. When the first housing 53 and the second housing 54 are matched, the accumulator cell groove in the at least one of the first housing 53 and the second housing 54 forms an accumulator cell compartment 56, and an accumulator cell 55 is arranged in the accumulator cell compartment 56. In the illustrated embodiment, the accumulator cell 55 is sealed in the accumulator cell compartment 56 through the first housing 53 and the second housing, which can make the appearance of the accumulator 5 be quadrate, better cooperate with the accumulator compartment 1111, and achieve the effect of easy take out and placement. The first housing 53 and the second housing 54 together form a quadrate accumulator housing body having a boss 57 protruded relative to the accumulator housing body, so that the quadrate accumulator 5 can have an effect of poka-yoke and can better cooperate with the accumulator compartment 1111. The setting of the boss 57 can also ensure that the accumulator is placed in the correct position when installed in the accumulator compartment 1111, and ensure that the circuit connection port 51 can be connected to the electric rolling curtain control box 2.

Referring to FIG. 10, in an illustrated embodiment, the accumulator housing body includes a first side surface 501, a second side surface 502, a third side surface 503 and a fourth side surface 504. The first side surface 501 and the third side surface 503 are arranged oppositely, the second side surface 502 and the fourth side surface 504 are arranged oppositely, the boss 57 is connected to the third side surface 503, and two sides of the boss 57 are connected to the third side surface 503.

Referring to FIGS. 8-9, in an illustrated embodiment, an accumulator key 58 is arranged on the side of the accumulator 5 away from the boss 57, which can be configured to display the power.

Referring to FIGS. 8-9, in an illustrated embodiment, when the accumulator is installed in the accumulator compartment, an end of the accumulator 5 close to the electric rolling curtain control box 2 is disposed with a second charging port 59 and a circuit connection port 51. The second charging port 59 is a charging port such as type C. After the accumulator is removed, the accumulator can be charged through the second charging port 59. The accumulator provided in the illustrated embodiment can be a lithium accumulator. The circuit connection port 51 connects the accumulator 5 to the electric rolling curtain control box 2. Therefore, the design of the boss 57 in the accumulator 5 in the illustrated embodiment can better avoid the wrong installation direction of the accumulator, and can better enable the circuit connection port 51 to be electrically connected to the electric rolling curtain control box 2 when the accumulator 5 is installed.

Referring to FIGS. 8-9, in an illustrated embodiment, end faces at two ends of the boss 57 are arc-shaped surfaces 571. In the illustrated embodiment, one end of the two ends of the boss 57 is a same end as the second charging port of the accumulator 5, and the other end is a same end as the bump of the accumulator 5. The accumulator 5 can be placed into the accumulator compartment 1111 more easily, and the accumulator can be taken more conveniently.

Figure 13:
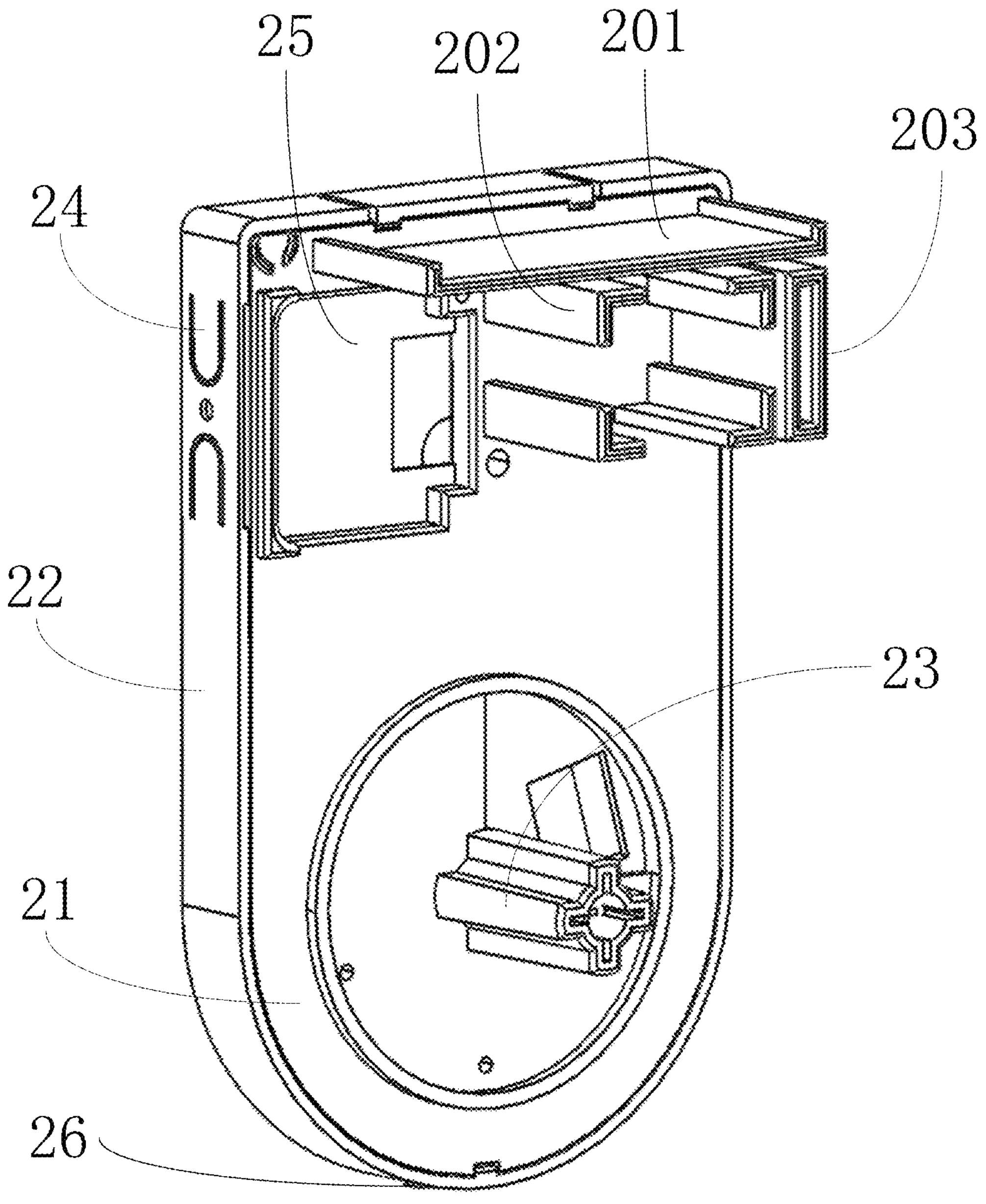
FIG. 13 is a schematic structural view of an electric rolling curtain control box according to an embodiment of the disclosure.
Figure 14:
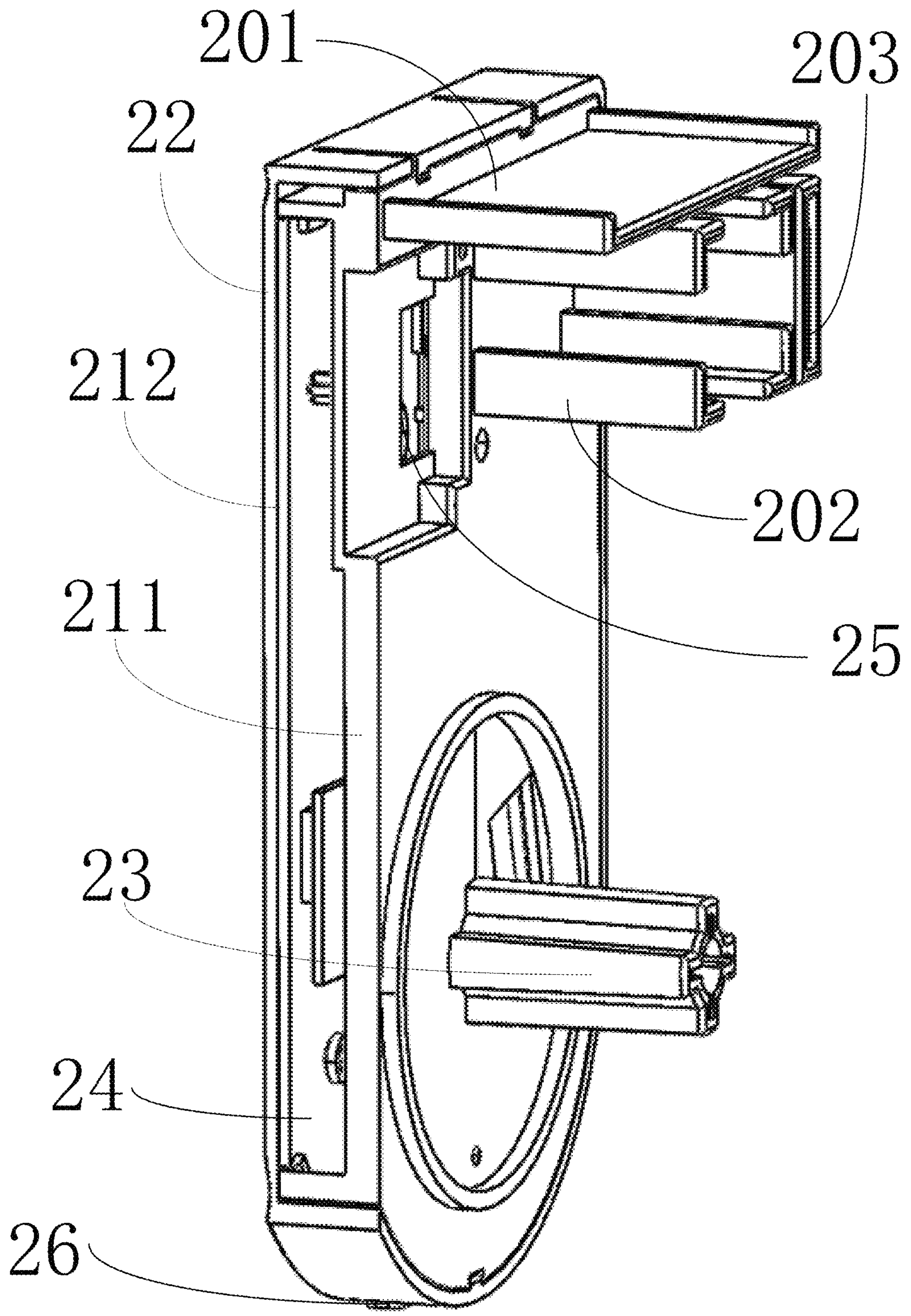
FIG. 14 is a schematic cross-sectional structural view of the electric rolling curtain control box according to an embodiment of the disclosure.

Referring to FIGS. 13-15, in an illustrated embodiment, the electric rolling curtain control box 2 includes a circuit board (not shown in the drawings), a first outer housing 21 and a second outer housing 22. The first outer housing 21 is closer to the roller 4 than the second outer housing 22. The side of the first outer housing 21 close to the roller 4 is disposed with a motor fixing part 23 partially inserted into the roller 4, which is in a cross-shaft structure. The motor assembly 3 is disposed with a motor fixing groove 31 partially inserted into the roller 4, and the motor fixing part 23 is inserted into the motor fixing groove 31 to connect the motor assembly 3 with the electric rolling curtain control box 2. The electric rolling curtain control box 2 can output the power of the accumulator 5 to the motor assembly 3 to realize the rotation of the motor assembly 3.

Referring to FIGS. 13-15, in an illustrated embodiment, there is a circuit board accommodating cavity 24 between the first outer housing 21 and the second outer housing 22, more specifically, the first outer housing 21 is disposed with the circuit board accommodating cavity 24, the circuit board is arranged in the circuit board accommodating cavity 24, and the circuit board accommodating cavity 24 is further disposed with a circuit outlet (not shown in the drawings). The second outer housing 22 can be detachably sleeved on the side of the first outer housing 21 away from the roller 4. The circuit outlet is communicated with a cavity formed between the first outer housing 21 and the second outer housing 22. The second outer housing 22 is detachably sleeved on the side of the first outer housing 21 away from the roller 4. After the circuit is installed, the second outer housing 22 covers the circuit outlet. The second outer housing 22 is configured to cover the side of the first outer housing 21 away from the roller 4 to ensure the aesthetics of the electric rolling curtain Referring to FIGS. 13-15, in an illustrated embodiment, an accumulator connection port 25 (accumulator interface) is arranged at an end of the electric rolling curtain control box 2 close to the rolling curtain mounting housing 1, which can be electrically connected to the accumulator 5 to output the power of the accumulator 5 to power the motor and charge the accumulator 5. A first charging port 26 is arranged at an end of the electric rolling curtain control box 2 close to the motor assembly 3 to charge the accumulator 5 through the electric rolling curtain control box 2. The accumulator connection port 25, the circuit board and the first charging port 26 are sequentially electrically connected in that order. The accumulator 5 provided by the illustrated embodiment is further disposed with a second charging port 59 at an end of the circuit connection port 51. The accumulator 5 can be removed for charging, or the accumulator 5 can be charged through the first charging port 26.

Referring to FIGS. 13-15, in an illustrated embodiment, the electric rolling curtain control box 2 includes a first inserting plate 201, a second inserting plate 202 and a third inserting plate 203. The first inserting plate 201, the second inserting plate 202 and the third inserting plate 203 all extend in the direction of the rolling curtain mounting housing 1 and are fixed with the rolling curtain mounting housing 1. The rolling curtain mounting housing 1 is disposed with a first wall plate 101, a side of the first wall plate 101 is disposed with a first groove 102, the other side is disposed with a second groove 103 and a third groove 104, and the accumulator compartment 1111 and the second groove 103 and the third groove 104 are located on the same side of the first wall plate 101. The first wall plate 101 forms one of the side walls of the accumulator compartment 1111, and the accumulator compartment 1111, the second groove 103 and the third groove 104 are sequentially arranged in that order. The first inserting plate 201 is inserted into the first groove 102, the second inserting plate 202 is inserted into the second groove 103, and the third inserting plate 203 is inserted into the third groove 104. The electric rolling curtain control box 2 can be better fixed at the end of the rolling curtain mounting housing 1 to achieve better fixing effect.

In an illustrated embodiment, the second groove 103 is a rectangular groove, and the second inserting plate 202 is inserted into the second groove 103 and abuts against four inner corners of the second groove 103 to achieve a more stable installation effect.

Figure 11:
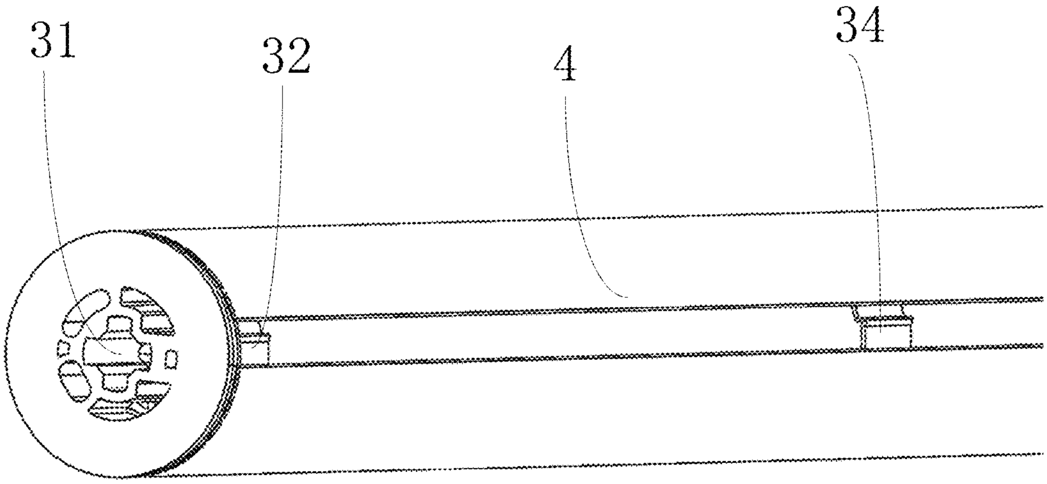
FIG. 11 is a schematic structural view of a roller matched with the motor assembly according to an embodiment of the disclosure.
Figure 12:
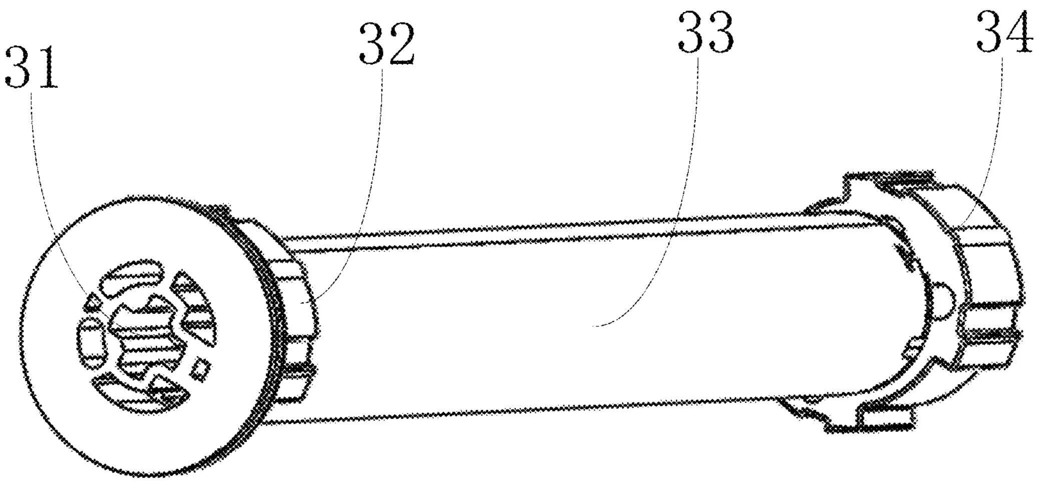
FIG. 12 is a schematic structural view of the motor assembly according to an embodiment of the disclosure.

Referring to FIGS. 11-12, in an illustrated embodiment, the motor assembly 3 includes a fixing member 32, a tubular motor housing 33, a motor, a rotating shaft (not shown in the drawings) and a connecting sleeve 34. The motor and the rotating shaft are connected with each other and located inside the tubular motor housing 33, which can better protect the motor from damage. The motor is configured to drive the rotating shaft to rotate, and the rotating shaft is connected to the connecting sleeve 34 to drive the connecting sleeve 34 to rotate. The connecting sleeve 34 is connected to the roller 4 to drive the roller 4 to rotate. The fixing member 32 is installed at one end of the tubular motor housing 33, part of the fixing member 32 extends into the tubular motor housing 33, and the part of the fixing member 32 extending into the tubular motor housing 33 is disposed with a motor fixing groove 31. The connecting sleeve 34 is installed at the other end of the tubular motor housing 33, and one part of the connecting sleeve 34 outside the tubular motor housing 33 is connected to the roller 4 to drive the roller 4 to rotate. During the operation of the motor, the rotating shaft drives the connecting sleeve 34 to rotate, and the connecting sleeve 34 drives the roller 4 to rotate during the rotation. During the operation of the motor, the tubular motor housing 33 may not rotate. The motor is protected in the tubular motor housing 33 through the tubular motor housing 33, which can better avoid motor damage.

Figure 23:
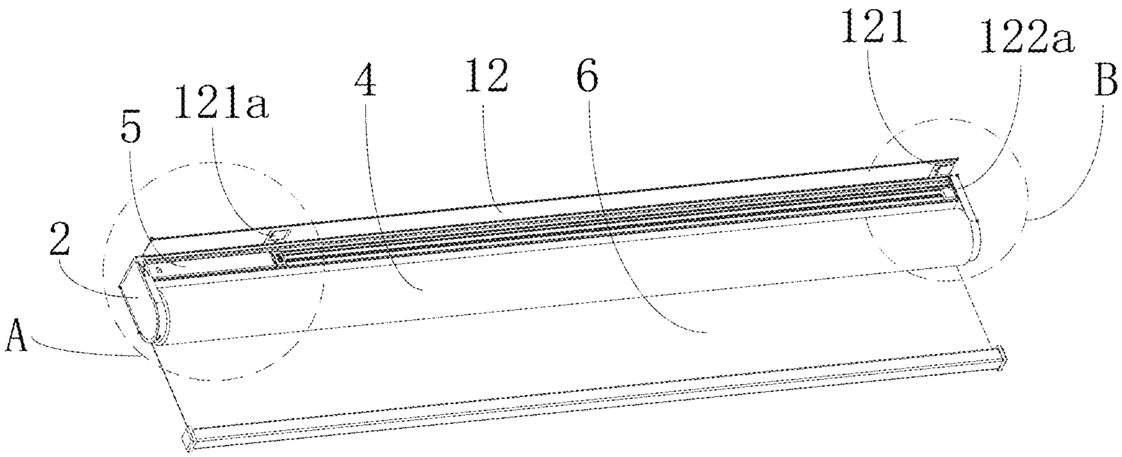
FIG. 23 is a schematic view of an overall structure of the electric rolling curtain with magnetic structures according to an embodiment of the disclosure.
Figure 24:
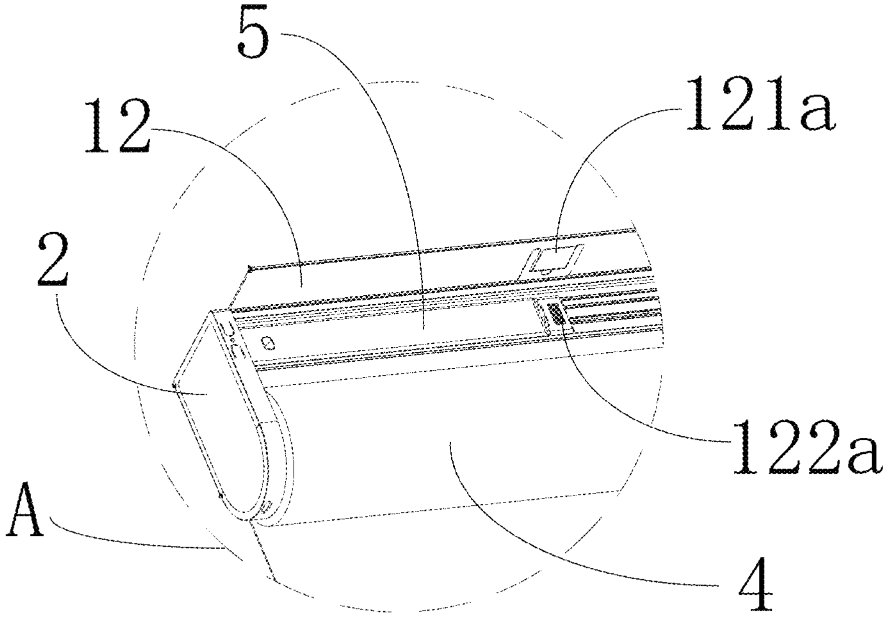
FIG. 24 is a schematic enlarged view of portion “A” in FIG. 23.
Figure 25:
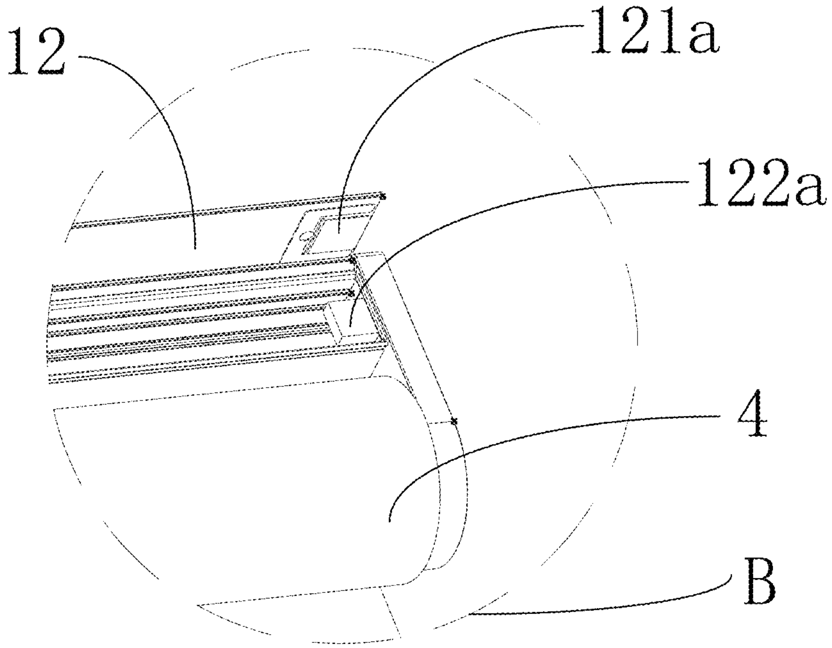
FIG. 25 is a schematic enlarged view of portion “B” in FIG. 23.

Referring to FIGS. 23-25, for the electric rolling curtain provided by the illustrated embodiment of the disclosure, the cover plate 12 is disposed with a first magnetic structure 121*a*, the housing body is disposed with a second magnetic structure 122*a* that can cooperate with the first magnetic structure 121*a*, and the first magnetic structure 121*a* and the second magnetic structure 122*a* can adsorb with each other, so that the cover plate 12 can close the accumulator placement opening. The electric rolling curtain provided by the disclosure makes the accumulator replacement easier to operate through the cooperation of the magnetic structure, and the closure and opening of the cover plate 12 are easier to realize.

Referring to FIGS. 23-25, in an illustrated embodiment, the accumulator installation part and the housing extension part are respectively disposed with a first magnetic structure 121*a*, the cover plate 12 is disposed with a second magnetic structure 122*a* at the position corresponding to the first magnetic structure 121*a* of the accumulator installation part, and the cover plate 12 is further disposed with a second magnetic structure 122*a* at the position corresponding to the first magnetic structure 121*a* of the accumulator installation part.

Referring to FIGS. 23-25, in an illustrated embodiment, the stop block 114 is disposed with a first magnetic structure 121*a*, and the end of the housing extension part away from the accumulator installation part is also disposed with the first magnetic structure 121*a*. When the first magnetic structure and the second magnetic structure can be adsorbed with each other, the cover plate can close the accumulator placement opening, the cover plate 12 cover the profile cavity 113 of the housing extension when the cover plate 12 close the accumulator placement opening, that is, the cover plate 12 covers the opening of the non-accumulator compartment when the cover plate 12 close the accumulator placement opening. In the illustrated embodiment, the housing body 11 is integrally formed and formed with a profile cavity 113. The stop block 114 is arranged in the profile cavity 113. The stop block 114 is configured to limit the length of the accumulator compartment 1111 so that part of the profile cavity 113 forms the accumulator compartment 1111. The cover plate 12 in the illustrated embodiment can close the accumulator compartment 1111 and the profile cavity 113 of the housing extension part at the same time, so that the overall aesthetics of the rolling curtain mounting housing 1 is greater.

Figure 4:
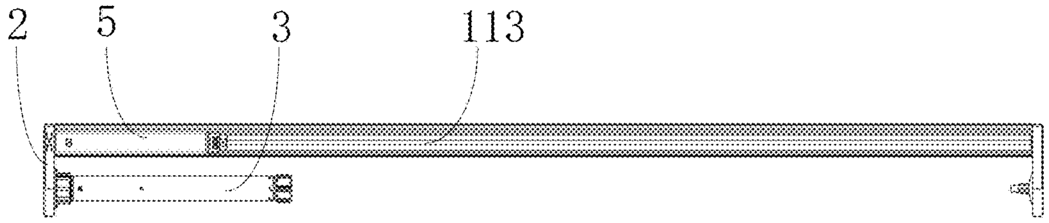
FIG. 4 is a schematic structural view of a motor assembly and a rolling curtain mounting housing according to an embodiment of the disclosure.
Figure 5:
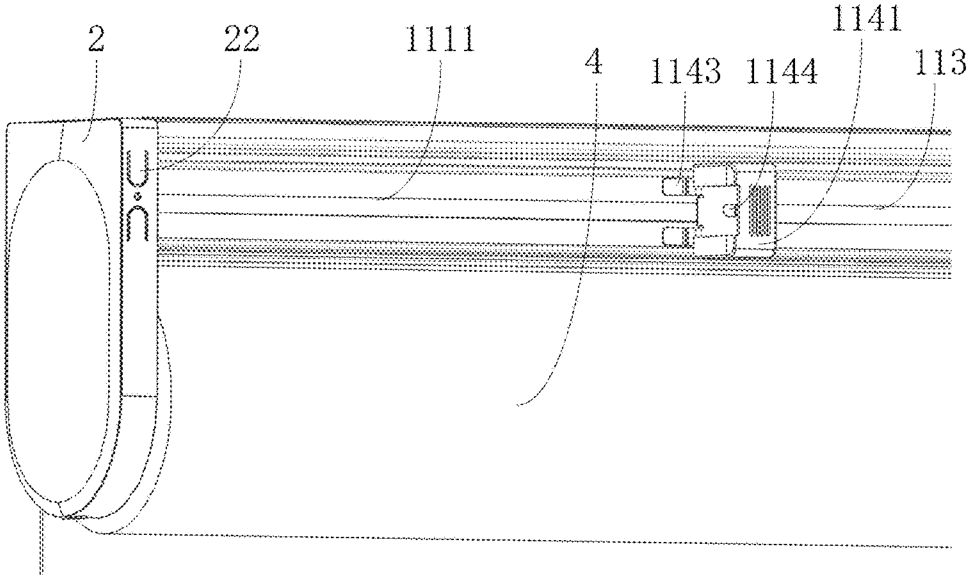
FIG. 5 is a schematic structural view of an accumulator compartment according to an embodiment of the disclosure.

Referring to FIGS. 4-5, in an illustrated embodiment, when the accumulator 5 is removed from the accumulator compartment 1111 and installed in the accumulator compartment 1111 again and electrically connected to the circuit board of the electric rolling curtain control box 2, the rolling curtain mounting housing shakes; or the roller shakes; or the rolling curtain mounting housing and the roller all shake. Alternatively, when the accumulator 5 is installed in the accumulator compartment 1111 and electrically connected to the circuit board of the electric rolling curtain control box 2, the roller rotates, such as forward rotation and/or reverse rotation of the roller for a certain time. After installing the accumulator 5, the user can quickly know whether the accumulator is installed correctly and whether the circuit is connected, reduce the number of user operations and have a better user experience.

In the disclosure, unless otherwise expressly provided and limited, the first feature "above" or "below" the second feature may be in direct contact with the first feature and the second feature, or the first feature and the second feature may be in indirect contact through an intermediate medium. Moreover, the first feature is "above", "over" and "on" the second feature, but the first feature is directly above or obliquely above the second feature, or only indicates that a horizontal height of the first feature is higher than the second feature. The first feature "below", "under" and "down" of the second feature can be that the first feature is directly or obliquely below the second feature, or it only indicates that the horizontal height of the first feature is less than that of the second feature.

In the description of this specification, the description referring to the terms "illustrated embodiment" or "specific embodiment" means that the specific features, structures, materials or features described in combination with the embodiments or examples are included in at least one embodiment or example of the disclosure. In the specification, the schematic expression of the above terms does not have to be for the same embodiments or examples. Further, the specific features, structures, materials or features described may be combined in any one or more embodiments or examples in a suitable manner. In addition, without contradiction, those skilled in the related art can combine the different embodiments or examples described in the specification and the features of different embodiments or examples.

Although the embodiments of the disclosure have been shown and described above, it can be understood that the above illustrated embodiments are exemplary and cannot be understood as restrictions on the disclosure. Those skilled in the related art can change, modify, replace and modify the above embodiments within the scope of the disclosure.

What is claimed is:

1. A rolling curtain mounting housing, comprising: a housing body; wherein the housing body is disposed with an accumulator compartment, the accumulator compartment is disposed with an accumulator placement opening, the rolling curtain mounting housing is disposed with a cover plate, and the cover plate is configured to close the accumulator placement opening:

wherein an accumulator is configured to be installed in the accumulator compartment, the accumulator is disposed with a boss, the accumulator comprises a first housing and a second housing engageable with each other, at least one of the first housing and the second housing is foamed with an accumulator cell groove, the accumulator cell groove in the at least one of the first housing and the second housing forms an accumulator cell compartment when the first housing is engaged with the second housing, an accumulator cell is arranged in the accumulator cell compartment, the first housing and the second housing together form a quadrate accumulator housing body having the boss protruded relative to the accumulator housing body;

wherein the accumulator housing body comprises a first side surface, a second side surface, a third side surface and a fourth side surface; the first side surface and the third side surface are arranged oppositely, the second side surface and the fourth side surface are arranged oppositely, the boss is connected to the third side surface, two sides of the boss are connected to the third side surface.

2. The rolling curtain mounting housing according to claim 1, wherein an end of the cover plate is hinged to the housing body, and another end of the cover plate is configured to switchably close and open the accumulator placement opening; the cover plate is disposed with a first magnetic structure, and the housing body is disposed with a second magnetic structure matched with the first magnetic structure; and the first magnetic structure and the second magnetic structure are capable of adsorbing with each other to thereby make the cover plate close the accumulator placement opening.

3. The rolling curtain installation housing according to claim 1, wherein the housing body is formed with a profile cavity, the profile cavity is disposed with a stop block therein, and the stop block is configured to separate the profile cavity to form an accumulator installation part and a housing extension part, and the housing extension part extends outwards relative to the accumulator installation part; the profile cavity of the accumulator installation part forms the accumulator compartment, and the profile cavity of the housing extension part forms a non-accumulator compartment.

4. The rolling curtain mounting housing according to claim 3, wherein an opening of the non-accumulator compartment and the accumulator placement opening are located on a same side of the housing body, and the cover plate covers the opening of the non-accumulator compartment of the housing extension part when the cover plate closes the accumulator placement opening.

5. The rolling curtain mounting housing according to claim 3, wherein the stop block comprises a stop body and an elastic sheet structure embedded in the stop body, the stop body is connected to a bottom of the profile cavity, the elastic sheet structure comprises an elastic sheet partially extending into the accumulator compartment, the elastic sheet is arranged at a bottom of the accumulator compartment, and the elastic sheet protrudes along a direction from the bottom of the accumulator compartment towards the accumulator placement opening;

wherein the elastic sheet structure further comprises an accumulator fixing part partially extending into the accumulator compartment, the accumulator fixing part is arranged between the elastic sheet and the accumulator placement opening, and the stop body is movable in the profile cavity to increase or decrease a distance between the stop block and an end of the housing body; and wherein the accumulator with a bump at an end thereof is configured to be installed in the accumulator compartment, the elastic sheet abuts against a bottom of the accumulator and the accumulator fixing part abuts against a side of the bump close to the accumulator placement opening when the accumulator is installed in the accumulator compartment.

6. The rolling curtain mounting housing according to claim 1, wherein a bottom of the accumulator compartment is opposite to the accumulator placement opening, the bottom of the accumulator compartment is disposed with a first convex bar and a second convex bar, a boss installation location is located between the first convex bar and the second convex bar, the first convex bar and the second convex bar protrude along a direction from the bottom of the accumulator compartment towards the accumulator placement opening, and each of the first convex bar and the second convex bar is disposed with a bending block inwardly bent towards the boss installation location;

wherein the boss installation location is disposed with a third convex bar protruding along the direction from the bottom of the accumulator compartment towards the accumulator placement opening, a protruded height of the third convex bar is less than a protruded height of each of the first convex bar and the second convex bar, and at least a side wall of the accumulator compartment is disposed with at least one fourth convex bar protruding from the side wall of the accumulator compartment to a middle of the accumulator compartment; and wherein when the accumulator is installed in the accumulator compartment, the boss is matched with the boss installation location, the third convex bar abuts against the bottom of the accumulator, and the at least one fourth convex bar abuts against at least one side wall of the accumulator.

7. The rolling curtain mounting housing according to claim 1, wherein the housing body is disposed with a first wall plate, a side of the first wall plate is disposed with a first groove, another opposite side is disposed with a second groove and a third groove, the first wall plate forms a side wall of the accumulator compartment, and the accumulator compartment, the second groove and the third groove are sequentially arranged on a same side of the first wall plate in that order.

8. The rolling curtain mounting housing according to claim 1, wherein end surfaces at the two ends of the boss are arc-shaped surfaces.

9. The rolling curtain mounting housing according to claim 1, wherein a side of the accumulator compartment is connected to an electric rolling curtain control box, a circuit board is arranged in the electric rolling curtain control box, and the circuit board is electrically connected to the accumulator in the accumulator compartment.

10. An electric rolling curtain, comprising: the rolling curtain mounting housing according to claim 1, a motor assembly and a roller; wherein the accumulator compartment is configured to be connected to the motor assembly, and the motor assembly is configured to drive the roller to rotate.

11. The electric rolling curtain according to claim 10, wherein the electric rolling curtain further comprises a curtain body wound on the roller, the accumulator is detachably installed in the accumulator compartment, the accumulator is electrically connected to the motor assembly, and an end of the curtain body is capable of extending or retracting during a rotation of the roller;

Wherein the end of the curtain body is located at an initial position when the electric rolling curtain is at an initial state of accumulator replacement;

wherein the end of the curtain body is located at a first position when the electric rolling curtain is at a retracting state during operation;

wherein the end of the curtain body is located at a second position when the electric rolling curtain is at an extending state during operation, and the first position and the second position both are lower than the initial position.

12. The electric rolling curtain according to claim 11, wherein the end of the curtain body is lower than a bottom of the roller when the end of the curtain body is located at the first position; or wherein the end of the curtain body is flush with the bottom of the roller when the end of the curtain body is at the first position.

13. The electric rolling curtain according to claim 11, wherein during switching to the initial state of accumulator replacement, the curtain body is driven to retract, and when the end of the curtain body located at the initial position is sensed, the curtain body is driven to stop retracting; or wherein there is a gap between the roller and the rolling curtain mounting housing, a diameter of the end of the curtain body is greater than the gap, so that the end of the curtain body is limited to outside the gap; the curtain body is driven to retract during switching to the initial state of accumulator replacement, and the curtain body is driven to stop retracting and the end of the curtain body is located at the initial position when it is sensed that a retracting resistance greater than a preset value is sensed.

14. The electric rolling curtain according to claim 10, wherein the electric rolling curtain further comprises an electric rolling curtain control box, the electric rolling curtain control box is arranged at an end of the housing body, the rolling curtain mounting housing and the motor assembly are installed on a same side of the electric rolling curtain control box, the electric rolling curtain control box is connected to the accumulator compartment and the motor assembly individually, at least an end of the roller is hollow to allow the motor assembly to be inserted into the roller, and the motor assembly is configured to drive the roller to rotate relative to the rolling curtain mounting housing when the motor assembly is working.

15. The electric rolling curtain according to claim 14, wherein an accumulator connection port is arranged at an end of the electric rolling curtain control box close to the rolling curtain mounting housing, the accumulator connection port is connected to the accumulator compartment, a first charging port is arranged at an end of the electric rolling curtain control box close to the motor assembly; the accumulator connection port, a circuit board and the first charging port are sequentially connected in that order, and the circuit board is arranged in the electric rolling curtain control box;

wherein when the accumulator is installed in the accumulator compartment, an end of the accumulator close to the electric rolling curtain control box is disposed with a second charging port and a circuit connection port, and the circuit connection port is configured to be connected to the electric rolling curtain control box.

16. The electric rolling curtain according to claim 14, wherein the electric rolling curtain control box comprises a first inserting plate, a second inserting plate and a third inserting plate, the first inserting plate, the second inserting plate and the third inserting plate extend towards the rolling curtain mounting housing; the rolling curtain mounting housing comprises a first wall plate, a side of the first wall plate is disposed with a first groove, another opposite side is disposed with a second groove and a third groove, the first wall plate forms a side wall of the accumulator compartment, the accumulator compartment, the second groove and the third groove are sequentially arranged on a same side of the first wall plate in that order, the first inserting plate is inserted into the first groove, the second inserting plate is inserted into the second groove, and the third inserting plate is inserted into the third groove; and/or wherein the electric rolling curtain control box comprises a circuit board, a first outer housing and a second outer housing, the first outer housing is closer to the roller than the second outer housing, a motor fixing part partially inserted into the roller is arranged on a side of the first outer housing, a motor fixing groove partially inserted into the roller is arranged on the motor assembly, the motor fixing part is inserted into the motor fixing groove, a circuit board accommodating cavity is disposed between the first outer housing and the second outer housing or on the first outer housing, the circuit board is arranged in the circuit board accommodating cavity, the circuit board accommodating cavity is disposed with a circuit outlet, the second outer housing is detachably sleeved on a side of the first outer housing away from the roller, and the second outer housing shields the circuit outlet when the second outer housing is sleeved on the side of the first outer housing away from the roller.

17. The electric rolling curtain according to claim 10, wherein the motor assembly comprises a fixing member, a tubular motor housing, a motor, a rotating shaft and a connecting sleeve; the motor and the rotating shaft are connected with each other and located inside the tubular motor housing, the fixing member is installed at an end of the tubular motor housing, a part of the fixing member extends into the tubular motor housing, the part of the fixing member is disposed with a motor fixing groove, the rotating shaft is connected to the connecting sleeve and configured to drive the connecting sleeve to rotate, the connecting sleeve is installed at another end of the tubular motor housing, a part of the connecting sleeve outside the tubular motor housing is connected to the roller and configured to drive the roller to rotate.

18. The electric rolling curtain according to claim 10, wherein the accumulator is configured to be detachably installed in the accumulator compartment and electrically connected to the motor assembly; the rolling curtain mounting housing and/or the roller shake(s) when the accumulator is installed in the accumulator compartment and in electrical conduction with the motor assembly, or the roller rotates when the accumulator is installed in the accumulator compartment and connected to the motor assembly.

* * * * *